(12) United States Patent
Janik

(10) Patent No.: US 7,937,450 B2
(45) Date of Patent: May 3, 2011

(54) SYSTEM FOR PROVIDING CONTENT, MANAGEMENT, AND INTERACTIVITY FOR THIN CLIENT DEVICES

(75) Inventor: Craig M. Janik, Los Altos Hills, CA (US)

(73) Assignee: Viviana Research LLC, Dover, DE (US)

( * ) Notice: Subject to any disclaimer, the term of this patent is extended or adjusted under 35 U.S.C. 154(b) by 808 days.

(21) Appl. No.: 10/775,285

(22) Filed: Feb. 9, 2004

(65) Prior Publication Data

US 2004/0253945 A1    Dec. 16, 2004
US 2009/0298490 A9    Dec. 3, 2009

Related U.S. Application Data

(60) Division of application No. 09/841,268, filed on Apr. 24, 2001, now abandoned, which is a continuation-in-part of application No. 09/519,007, filed on Mar. 3, 2000, now abandoned.

(60) Provisional application No. 60/268,434, filed on Feb. 12, 2001, provisional application No. 60/199,638, filed on Apr. 25, 2000, provisional application No. 60/122,727, filed on Mar. 4, 1999.

(51) Int. Cl.
    *G06F 15/16*      (2006.01)
(52) U.S. Cl. ........ 709/217; 709/203; 709/219; 709/249; 715/716
(58) Field of Classification Search .................. 709/203, 709/217–219, 231, 249; 707/1; 725/1, 100, 725/110; 715/716, 733
See application file for complete search history.

(56) References Cited

U.S. PATENT DOCUMENTS

| | | | |
|---|---|---|---|
| 4,682,370 A | 7/1987 | Matthews |
| 4,866,787 A | 9/1989 | Olesen |
| 4,962,528 A | 10/1990 | Herrera |
| 5,127,045 A | 6/1992 | Cragun et al. |
| 5,276,909 A | 1/1994 | Milner et al. |
| 5,282,246 A | 1/1994 | Yang |
| 5,410,344 A | 4/1995 | Graves et al. |

(Continued)

FOREIGN PATENT DOCUMENTS

EP      0 733 983      9/1996

(Continued)

OTHER PUBLICATIONS

"Lightnet the web of planetary consciousness—Ericsson's entry revitalizes WebPad scene", Source: IDG—Hanover, Germany, Feb. 12, 2000, http://www.lighnetco.uk/informer/scitech/20000301, pp. 2 pgs. total.

(Continued)

*Primary Examiner* — Ramy M Osman

(57) ABSTRACT

A system is provided for delivering Internet and digital content to a variety of thin client devices. A web portal for accessing and selecting content is used in conjunction with graphical user interfaces on a personal computer for setting up and controlling the content channels. The user interfaces, scheduling, and communication management are controlled by a system control software application running on a local server with an Internet connection. A high speed local area network provides for streaming content from the Internet or local server to thin client devices. A digital audio playback device is connected to the local server via the local area network connection and decodes streamed audio files, and converts them into analog audio signals for input into a conventional stereo. Digital content is streamed automatically from the local server to another Internet playback device, based on end user content preferences and schedule selections.

21 Claims, 30 Drawing Sheets

U.S. PATENT DOCUMENTS

Figure 1:
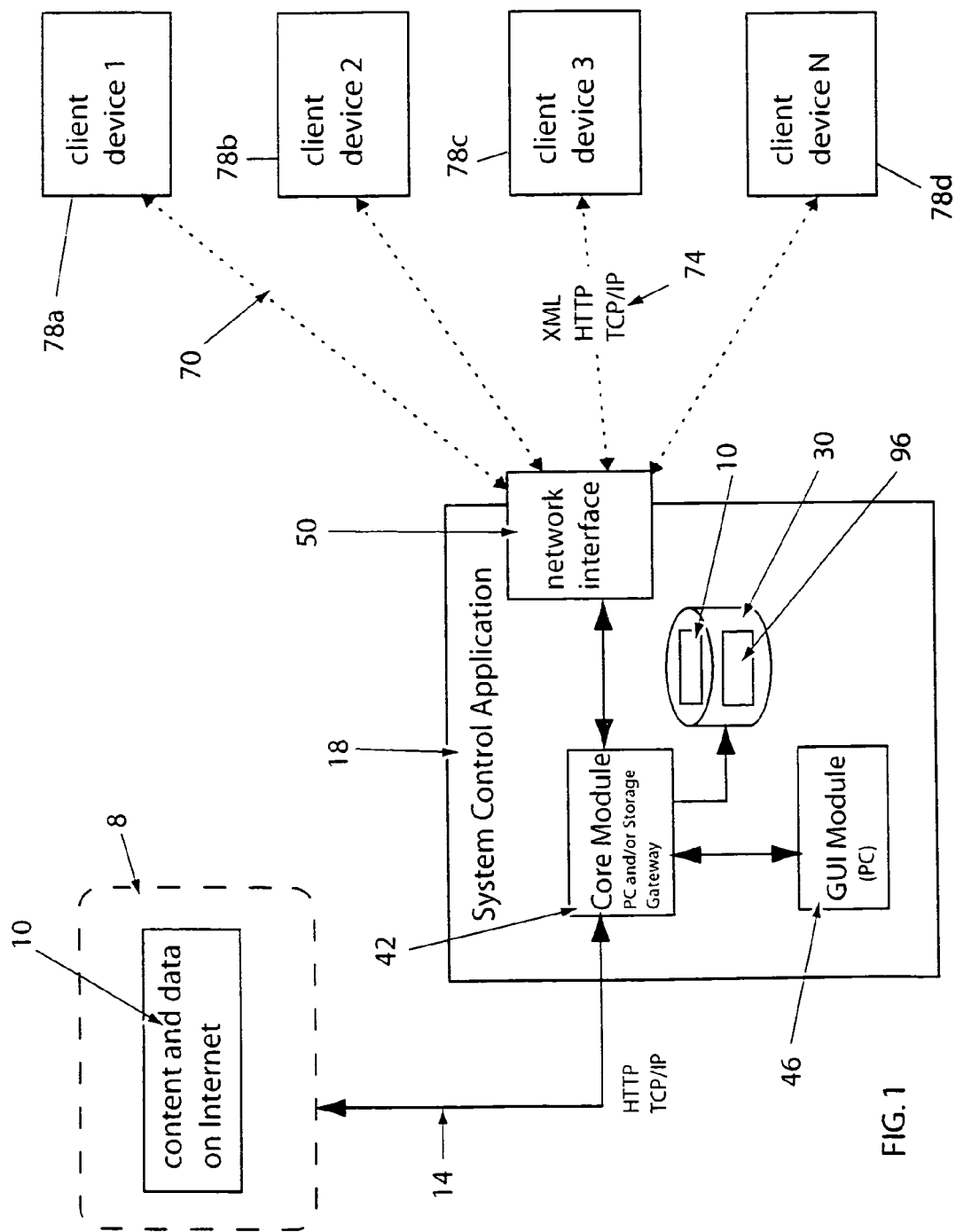

| | | | |
|---|---|---|---|
| 5,434,860 A | 7/1995 | Riddle | |
| 5,481,616 A | 1/1996 | Freadman | |
| 5,522,089 A | 5/1996 | Kikinis et al. | |
| 5,523,781 A | 6/1996 | Brusaw | |
| 5,528,316 A | 6/1996 | Lee | |
| 5,552,089 A * | 9/1996 | Misselyn et al. | 510/417 |
| 5,606,594 A | 2/1997 | Register et al. | |
| 5,640,453 A | 6/1997 | Schuchman et al. | |
| 5,651,070 A | 7/1997 | Blunt | |
| 5,701,451 A * | 12/1997 | Rogers et al. | 707/1 |
| 5,721,827 A | 2/1998 | Logan et al. | |
| 5,724,567 A | 3/1998 | Rose et al. | |
| 5,739,665 A | 4/1998 | Bares | |
| 5,742,599 A | 4/1998 | Lin et al. | |
| 5,758,257 A | 5/1998 | Herz et al. | |
| 5,774,664 A | 6/1998 | Hidary et al. | |
| 5,786,768 A | 7/1998 | Chan et al. | |
| 5,790,897 A | 8/1998 | Corder et al. | |
| 5,790,935 A * | 8/1998 | Payton | 725/91 |
| 5,793,980 A | 8/1998 | Glaser et al. | |
| 5,831,664 A | 11/1998 | Wharton et al. | |
| 5,832,067 A | 11/1998 | Herold | |
| 5,844,862 A | 12/1998 | Cocatre-Zilgien | |
| 5,847,922 A | 12/1998 | Smith et al. | |
| 5,852,545 A | 12/1998 | Pan-Ratzlaff | |
| 5,859,970 A | 1/1999 | Pleso | |
| 5,860,001 A | 1/1999 | Cromer et al. | |
| 5,864,708 A | 1/1999 | Croft et al. | |
| 5,884,028 A | 3/1999 | Kindell et al. | |
| 5,889,506 A | 3/1999 | Lopresti et al. | |
| 5,890,016 A | 3/1999 | Tso | |
| 5,905,523 A | 5/1999 | Woodfield et al. | |
| 5,907,322 A | 5/1999 | Kelly et al. | |
| 5,907,793 A | 5/1999 | Reams | |
| 5,915,026 A | 6/1999 | Mankovitz | |
| 5,926,624 A | 7/1999 | Katz et al. | |
| 5,961,602 A | 10/1999 | Thompson et al. | |
| 5,964,830 A * | 10/1999 | Durrett | 709/200 |
| 5,974,441 A * | 10/1999 | Rogers et al. | 709/200 |
| 5,978,807 A | 11/1999 | Mano et al. | |
| 5,978,833 A | 11/1999 | Pashley et al. | |
| 5,990,885 A | 11/1999 | Gopinath | |
| 5,991,305 A | 11/1999 | Simmons et al. | |
| 5,991,306 A | 11/1999 | Burns et al. | |
| 6,005,566 A | 12/1999 | Jones et al. | |
| 6,008,777 A | 12/1999 | Yiu | |
| 6,011,853 A | 1/2000 | Koski et al. | |
| 6,012,083 A | 1/2000 | Savitzky et al. | |
| 6,023,241 A | 2/2000 | Clapper | |
| 6,038,542 A | 3/2000 | Ruckdashel | |
| 6,043,976 A | 3/2000 | Su | |
| 6,052,145 A | 4/2000 | Macrae et al. | |
| 6,055,566 A * | 4/2000 | Kikinis | 709/219 |
| 6,104,334 A | 8/2000 | Allport | |
| 6,115,248 A | 9/2000 | Canova et al. | |
| 6,134,584 A | 10/2000 | Chang et al. | |
| 6,148,353 A | 11/2000 | Cho | |
| 6,154,771 A | 11/2000 | Rangan et al. | |
| 6,169,879 B1 | 1/2001 | Perlman | |
| 6,170,060 B1 * | 1/2001 | Mott et al. | 726/29 |
| 6,177,931 B1 | 1/2001 | Alexander et al. | |
| 6,181,284 B1 | 1/2001 | Madsen et al. | |
| 6,205,485 B1 | 3/2001 | Kikinis | |
| 6,208,384 B1 | 3/2001 | Schultheiss | |
| 6,209,011 B1 | 3/2001 | Vong et al. | |
| 6,229,430 B1 | 5/2001 | Smith Dewey | |
| 6,243,772 B1 | 6/2001 | Ghori et al. | |
| 6,259,707 B1 | 7/2001 | Dara-Abrams et al. | |
| 6,263,503 B1 | 7/2001 | Margulis | |
| 6,289,165 B1 | 9/2001 | Abecassis | |
| 6,304,895 B1 | 10/2001 | Schneider et al. | |
| 6,321,991 B1 | 11/2001 | Knowles | |
| 6,324,182 B1 | 11/2001 | Burns et al. | |
| 6,326,982 B1 | 12/2001 | Wu et al. | |
| 6,351,467 B1 | 2/2002 | Dillon | |
| 6,353,635 B1 | 3/2002 | Montague et al. | |
| 6,360,101 B1 | 3/2002 | Irvin | |
| 6,401,059 B1 | 6/2002 | Shen et al. | |
| 6,424,369 B1 | 7/2002 | Adair et al. | |
| 6,434,403 B1 | 8/2002 | Ausems et al. | |
| 6,434,747 B1 | 8/2002 | Khoo et al. | |
| 6,437,836 B1 | 8/2002 | Huang et al. | |
| 6,442,529 B1 | 8/2002 | Krishan et al. | |
| 6,453,355 B1 | 9/2002 | Jones et al. | |
| 6,467,089 B1 | 10/2002 | Aust et al. | |
| 6,483,986 B1 | 11/2002 | Krapf | |
| 6,484,212 B1 | 11/2002 | Markowitz et al. | |
| 6,496,692 B1 | 12/2002 | Shanahan | |
| 6,501,581 B1 | 12/2002 | Snyder et al. | |
| 6,507,273 B1 | 1/2003 | Chang et al. | |
| 6,509,908 B1 | 1/2003 | Croy et al. | |
| 6,516,340 B2 | 2/2003 | Boys | |
| 6,518,902 B2 | 2/2003 | Panasik et al. | |
| 6,526,581 B1 | 2/2003 | Edson | |
| 6,535,590 B2 | 3/2003 | Tidwell et al. | |
| 6,539,433 B1 | 3/2003 | Tominaga et al. | |
| 6,542,721 B2 | 4/2003 | Boesen | |
| 6,549,942 B1 | 4/2003 | Janky et al. | |
| 6,557,756 B1 | 5/2003 | Smith | |
| 6,577,849 B1 | 6/2003 | Eaton et al. | |
| 6,581,103 B1 | 6/2003 | Dengler | |
| 6,587,822 B2 | 7/2003 | Brown et al. | |
| 6,594,682 B2 | 7/2003 | Peterson et al. | |
| 6,611,537 B1 * | 8/2003 | Edens et al. | 370/465 |
| 6,611,654 B1 | 8/2003 | Shteyn | |
| 6,650,889 B1 | 11/2003 | Evans et al. | |
| 6,653,933 B2 * | 11/2003 | Raschke et al. | 370/203 |
| 6,657,654 B2 | 12/2003 | Narayanaswami | |
| 6,658,123 B1 | 12/2003 | Crutcher | |
| 6,678,215 B1 * | 1/2004 | Treyz et al. | 379/110.01 |
| 6,678,737 B1 | 1/2004 | Bucher | |
| 6,700,893 B1 | 3/2004 | Radha et al. | |
| 6,708,213 B1 | 3/2004 | Bommaiah et al. | |
| 6,708,217 B1 | 3/2004 | Colson et al. | |
| 6,717,952 B2 | 4/2004 | Jones et al. | |
| 6,725,460 B1 * | 4/2004 | Nishiyama et al. | 715/716 |
| 6,744,763 B1 | 6/2004 | Jones et al. | |
| 6,762,690 B1 * | 7/2004 | Diehl et al. | 340/825.24 |
| 6,823,225 B1 | 11/2004 | Sass | |
| 6,826,283 B1 | 11/2004 | Wheeler et al. | |
| 6,829,648 B1 | 12/2004 | Jones et al. | |
| 6,832,288 B2 | 12/2004 | Ohta et al. | |
| 6,834,308 B1 | 12/2004 | Ikezoye et al. | |
| 6,842,779 B1 | 1/2005 | Nishizawa | |
| 6,889,382 B1 | 5/2005 | Anderson | |
| 7,043,532 B1 * | 5/2006 | Humpleman et al. | 709/208 |
| 7,117,259 B1 * | 10/2006 | Rohwer | 709/223 |
| 7,117,516 B2 | 10/2006 | Khoo et al. | |
| 7,130,616 B2 | 10/2006 | Janik | |
| 7,191,242 B1 | 3/2007 | Serenyi et al. | |
| 7,293,280 B1 | 11/2007 | Gupta et al. | |
| 7,313,808 B1 | 12/2007 | Gupta et al. | |
| 7,349,975 B2 | 3/2008 | Kikinis | |
| 7,366,788 B2 | 4/2008 | Jones et al. | |
| 7,458,091 B1 * | 11/2008 | Getsin et al. | 709/227 |
| 7,516,078 B2 | 4/2009 | Dhawan et al. | |
| 2002/0011923 A1 | 1/2002 | Cunningham et al. | |
| 2002/0056112 A1 | 5/2002 | Dureau et al. | |
| 2002/0078248 A1 | 6/2002 | Janik et al. | |
| 2002/0103880 A1 * | 8/2002 | Konetski et al. | 709/218 |
| 2003/0003872 A1 | 1/2003 | Brinkley et al. | |
| 2004/0117845 A1 | 6/2004 | Karaoguz et al. | |
| 2005/0028208 A1 | 2/2005 | Ellis et al. | |
| 2006/0031551 A1 | 2/2006 | Agresta et al. | |

FOREIGN PATENT DOCUMENTS

| | | |
|---|---|---|
| EP | 0992921 A2 | 4/2000 |
| EP | 1 003 115 | 5/2000 |
| EP | 0909112 B1 | 1/2004 |
| EP | 1 617 334 | 1/2006 |
| GB | 2 312 591 | 10/1997 |
| GB | 2 343 073 | 4/2000 |
| JP | 2004-326459 | 11/2004 |
| WO | WO-99/04568 | 1/1999 |

| | | |
|---|---|---|
| WO | WO-99/05613 | 2/1999 |
| WO | 9918506 A1 | 4/1999 |
| WO | WO-99/39466 | 5/1999 |
| WO | WO-99/65209 | 12/1999 |
| WO | 0023899 A1 | 4/2000 |
| WO | 0049731 A1 | 8/2000 |
| WO | WO 01/10124 A1 | 2/2001 |
| WO | 0147192 A1 | 6/2001 |
| WO | WO-02/21248 | 3/2002 |
| WO | WO-02/21838 | 3/2002 |
| WO | PCT/US 01/31996 | 5/2002 |

OTHER PUBLICATIONS

PR Newswire, New Company Xenote Allows Consumers to 'Bookmark the Real World' with Fun, Personal Internet Device, Jan. 25, 2000, 2pgs.

G. Degoulet et al., EPEOS—Automatic Program Recording System, Nov. 1975, 22 pgs.

Tivo, Inc., Form S-1, Jul. 22, 1999, 902 pgs.

"Electronic Notes," Electronic Commerce Review, Jul. 1, 1998, vol. 1 Issue: 7, Phillips Business Information.

International Preliminary Examination Report for PCT/US01/24933 completed Aug. 19, 2004.

The International Search Report for PCT/US01/24933 completed May 14, 2002.

International Search Report and Written Opinion for PCT/US06/16861 mailed Aug. 30, 2007.

EPO communication for Application No. 01 959 676.6 dated Jan. 25, 2005.

EPO communication for Application No. 01 959 676.6 dated Jul. 26, 2005.

EPO communication for Application No. 01 959 676.6 dated Mar. 17, 2004.

EPO communication for Application No. 01 979 776.0 dated Mar. 17, 2004.

EPO communication for Application No. 01 979 776.0 dated Sep. 28, 2004.

European Search Report, Application No. EP 01 95 9676 dated Sep. 16, 2004.

International Search Report for PCT/US00/28369 mailed Mar. 9, 2001.

International Preliminary Report on Patentability for PCT/US06/16861 issued Nov. 19, 2007.

EPO communication for Application 0970882.7, dated Jun. 6, 2006.

National Semiconductor, "The Age of Information Access," Online Jun. 12, 1999, XP002202547, Retrieved from the Intenet on Jun. 18, 2002, <URL:http://aldenbaran.elo.utfsm.cl/datasheet/national/htm/nsc00958.htm>.

National Semiconductor, "WebPAD—Portable Web Access (datasheet)" 800605-001, Online Jul. 22, 1999, XP002202548, Retrieved from the Internet on Jun. 18,2002, <URL:http://aldebaran.elo.utfsm.cl/datasheet/national/pdf/nsc04795.pdf>.

Roy, Deb K. et al., News Comm: A Hand-Held Interface for Interactive Access to Structured Audio, CHI 96 Conference, pp. 173-180, Apr. 13-18, 1996.

Sheng, S. et al., "A Portable Multimedia Terminal," IEEE Communications Magazine, IEEE Service Center, Piscataway, New York, USA, vol. 30, No. 12, Dec. 1, 1992, pp. 64-75, XP000330091, ISSN: 0163-6804.

Truman, T.E. et al., "The InfoPad Multimedia Terminal: A Portable Device for Wireless Information Access," IEEE Transactions on Computers, IEEE Inc., New York, USA, vol. 47, No. 10, Oct. 1, 1998, pp. 1073-1087, XP000781992, ISSN: 0018-9340.

Office Action on U.S. Appl. No. 11/131,008, mailed Sep. 2, 2009.

Communication for European Patent Application 00970882.7, mailed Dec. 16, 2009.

European Search Report for European Patent Application 06758940.8, mailed Nov. 27, 2009.

Office Action on U.S. Appl. No. 11/368,871, mailed Oct. 15, 2009.
Office Action on U.S. Appl. No. 11/368,871, mailed Sep. 7, 2010.
Office Action on U.S. Appl. No. 11/368,871, mailed Mar. 31, 2010.
Non-Final Office Action on U.S. Appl. No. 11/368,871, mailed Nov. 8, 2010.
Non-Final Office Action on U.S. Appl. No. 12/246,585, mailed Jan. 20, 2011.

* cited by examiner

SYSTEM FOR PROVIDING CONTENT, MANAGEMENT, AND INTERACTIVITY FOR THIN CLIENT DEVICES

This application is a divisional application of U.S. patent application Ser. No. 09/841,268, filed Apr. 24, 2001, entitled "System for Providing Content, Management, and Interactivity for Thin Client Devices," which claims benefit of 60/268,434, filed Feb. 12, 2001, and 60/199,638, filed Apr. 25, 2000, and which is a Continuation-in-Part (CIP) of patent application Ser. No. 09/519,007, filed Mar. 3, 2000, which claims benefit to 60/122,727, filed Mar. 4, 1999.

FIELD OF THE INVENTION

A system is disclosed for providing user specified channels for moving content from the Internet and local storage device to one or more networked devices for access by end users. More specifically, content and data is delivered to a variety of devices via a caching gateway device and a local area network. Software residing on a PC or PC in combination with a storage gateway device provides content distribution, management, and interaction functions.

DEFINITIONS

Web, world wide web, and Internet are used here interchangeably, and are defined as the sum total of all connected computers on the planet, the connection being via standardized digital communications protocols; such as TCP-IP and HTTP and the like, including wirelessly linked devices that may use other protocols.

Broadband connection is defined as a communications network in which the frequency bandwidth can be divided and shared by multiple simultaneous signals. A broadband connection to the Internet typically provides minimum upstream and downstream data-rates of approximately 200K or more bits per second. There are many different types of broadband connections including DSL, cable modems, and fixed and mobile wireless connections.

A DOCSIS (Data Over Cable System Interface Specification) modem is an industry standard type of cable modem that is used to provide broadband access to the Internet over a coaxial cable physical layer that is also used for the delivery of cable TV signals (CATV). DOCSIS modems are well known in the telecommunications industry and will not be described here in detail.

A DSL (Digital Subscriber Line) modem is also an industry standard type of modem that is used to provide broadband access to the Internet, but over conventional copper phone lines (local loops). DSL modems are well known in the telecommunications industry and will not be described here in further detail.

The term gateway, used interchangeably with broadband gateway, is defined as an integral modem and router, and may include hub functionality. The modem function is used to change voltage fluctuations on an input carrier line (a DSL line input or a cable TV input) into digital data Modems (modulator/demodulator) are a well-known technology in the telecommunications market and will not be addressed in detail here. Routers are devices that connect one distinct network to another by passing only certain IP addresses that are targeted for specific networks. Hubs allow one network signal input to be split and thus sent to many devices. Routers and hubs are well known technologies in the network and telecommunications industry so they will not be described here in detail.

Gateway storage peripheral is defined as an add-on storage device with processing power, an operating system, and a software application that manages the downloading and storage of data. An example scenario for the use of a gateway storage peripheral is a system where a user has a DOCSIS modem and would like to add an always-on storage capability. The gateway storage peripheral is connected to the DOCSIS modem via a USB port or an Ethernet port in the DOCSIS modem. USB disks are well known in the computer storage peripheral industry, and are available for purchase. A gateway storage peripheral in combination with a DOCSIS modem or any type of broadband modem is considered a storage gateway system. A PC that is always left on and connected to an always-on gateway with a DSL or broadband cable connection is considered a storage gateway system.

The term "message" is defined as information that is sent digitally from one computing device to another for various purposes. The term "content" is used to mean the information contained in digital files or streams that is meaningful, relevant, and desired, by end-users. For example, content is entertainment or news, that is, information that was for the most part created by entities other than the end-user, or for example, audio files in MP3 format. "Data" is used to mean information created by end-users such as digital schedule contents, responses from devices sent back through the system, or digital messages and email. "Content" and "data" are sometimes used interchangeably.

Local Area Network (LAN) is defined as a network structure that includes two or more devices that can communicate with other devices utilizing a shared communication infrastructure, including wired network technologies, such as Ethernet, or wireless network technologies such as 802.11b or HomeRF technology. Wireless LAN technology such as 802.11b and HomeRF are based on the unlicensed 2.4 Ghz ISM (Industrial, Scientific, and Medical) frequency band and are well known the telecommunications and LAN industries. These networking technologies utilize Transmission Control Protocol/Internet Protocols (hereafter TCP/IP) protocols. Since these protocols and these technologies are well known, they will not be addressed here in detail. A LAN typically constitutes a group of interconnected devices that share a common geographic location and are typically grouped together as a subnet. A local network for example would be a home network where several computers and other smart devices, such as the Internet clock (described below), would be digitally connected for the purpose of transferring content and data, controlling each other, sharing programming, or presenting data and content to an end user.

Codec (Compression/Decompression algorithm) is a software application that is used to decode (uncompress) encoded (compressed) media files or streams. Most content is stored and sent in a compressed format so that the content files are smaller and thus take up less storage space and use less bandwidth when being transferred via the Internet. The content is then decoded at the playback device. For example, MP3 audio files are encoded and must be decoded by a microprocessor running the codec in order for the audio content to be presented to the user in an analog format. Codecs for both video and audio are a well-known field of digital media technology and will not described here in detail.

HTTP is Hyper-text transfer protocol, the protocol used by Web browsers and Web servers to transfer files, such as text and graphic files.

Data-rate is defined as the data throughput of a telecommunications system or technology, and is measured in a quantity of bits per second, such as millions of bits per second (Mbps).

BACKGROUND AND DESCRIPTION OF PRIOR ART

The rapid buildup of telecommunications infrastructure combined with substantial investment in Internet-based businesses and technology has brought Internet connectivity to a large segment of the population. Recent market statistics show that a majority of households in the U.S. own at least one personal computer (PC), and a significant number of these PCs are connected to the Internet. Many households include two or more PCs, as well as various PC productivity peripherals such as printers, scanners, and the like. Decreases in the cost of PC components such as microprocessors, hard disk drives, memory, and displays, have driven the commoditization of PCs. Although the majority of household PCs are connected to the Internet by dialup modem connections, broadband connectivity is being rapidly adopted, and is decreasing in price as a variety of technologies are introduced and compete in the marketplace. A large majority of households in the U.S. and Europe is viable for at least one or more type of broadband connection, such as cable, DSL, optical networks, fixed wireless, or two-way satellite transmission.

A market for home networking technology has emerged, driven by the need to share an Internet connection between two or more PCs, and to connect all the PCs to productivity peripherals. There has been innovation in LAN technology based on end-user desire for simplicity and ease of installation. Installing Ethernet cable is impractical for a majority of end-users, therefore a number of no-new-wires technologies have been introduced. The Home Phoneline Networking Association (HPNA) promotes networking products that turn existing phone wiring in the home into an Ethernet physical layer. Adapters are required that allow each device to plug into any RJ-11 phone jack in the home. The adapter modifies the signal from devices so that it can be carried by the home phone lines. Existing HPNA products provide data-rates equivalent to 10base-T Ethernet, approximately 10 Mbps. Networking technology that uses the AC power wiring in the home to carry data signals has also appeared, notably from Intellon Corporation, of Ocala, Fla. Similar to HPNA devices, adapters are required to convert data signals from devices into voltage fluctuations carried on to and off of the AC wires, allowing any AC outlet to become a network interface. Although both HPNA and power line networking products are convenient to use because they require no new wires, the advantage of AC power line products over HPNA is that AC power outlets are more ubiquitous than RJ-11 phone jacks.

Wireless radio-frequency (RF) LAN technology has also been introduced into the home networking market. Theoretically, wireless technology is the most convenient for the end user to install. There are currently two prevalent standards for wireless networking, 802.11b and HomeRF. Both of these systems utilize the unlicensed 2.4 Ghz ISM band as the carrier frequency for the transmission of data Both of these technologies have effective ranges of approximately 150 feet in a typical household setting. 802.11b is a direct sequence spread spectrum technology, and is provided by a variety of telecommunication OEMs such as Lucent Corporation of Murray Hill, N.J. HomeRF is a frequency-hopping spread spectrum technology and is also provided by a variety of telecommunications OEMs such as Proxim, Inc., of Sunnyvale, Calif. Adapters that are RF transceivers are required for each device to communicate on the network. In addition to utilizing TCP/IP protocols, each of 802.11b and HomeRF include additional encryption and security protocol layers so that the user's devices have controlled access to data being sent through the LAN.

Due to market competition and the effect of Moore's Law, home networking technology is greatly increasing in performance and availability, while decreasing in price. For example, the current data-rate roadmap shows HomeRF increasing from 10 Mbps to 20 Mbps, utilizing the 5 Ghz band. The 802.11 technology roadmap shows the introduction of 802.11a at 54 Mbps, also utilizing the 5 Ghz band. It is important to note that LAN data-rates are increasing much faster than wide-area data-rates, such as the data-rates provided by "last mile" technologies including DSL, DOCSIS. Wireless wide area data-rates are also improving slowly. Current digital cellular technology provides less than 64 Kbps data-rates, with most systems providing throughput in the 20 Kbps range.

While networked PCs with Internet connectivity provide greater convenience for productivity applications, there are other trends that are influencing end user's content experiencing habits. For example, Personal Video Recorders (hereafter PVRs), such as the technology provided by Tivo, of Santa Clara, Calif., are increasing in popularity. These devices are an improvement on VCR "time-shifting" functionality, allowing users to record, pause, and start live broadcast media, almost in real time. These devices digitize terrestrially broadcast television content and store the files on a hard disk drive, providing much faster random access, fast-forwarding, and rewinding. A graphical user interface is provided that allows users to make content preference selections. A PVR supports the trend toward user controlled "anytime" access to digital content.

The MP3 digital audio format is an audio encoding technology that allows consumers to further compress digital audio files such as those found on Compact Disks, to much smaller sizes with very little decrease in sound quality. The MP3 format is the audio layer of MPEG-2 digital audio and video compression and transmission standard. For example, the MP3 format allows for compression of audio content to approximately 1 million bytes per minute of audio, at near Compact Disk quality. This capability, combined with a decrease in the cost of flash memory, a type of non-volatile silicon-based mass memory, has made it possible to develop affordable, portable digital audio playback devices. These are devices that are significantly smaller than portable CD players because they contain no moving parts, only flash memory and a microprocessor for decoding MP3 compressed audio content.

PC-based MP3 software players have been created that provide a convenient graphical user interface and software decoding of MP3 files. The most popular player is the Winamp player, is provided by American Online/Time Warner. Winamp allows users to play MP3 files on their PC, using an existing sound card with external speakers. However, to listen to MP3 s the user must interface with the PC, using a mouse and keyboard, and must be nearby the PC sound output equipment.

The smaller size of MP3 encoded audio files has also enabled these files to be shared by users across the Internet, since the transfer of these files takes an acceptable amount of time. Internet-based digital music access and distribution service businesses have appeared, such as MP3.com and Napster.com, that provide various means for users to gain access to digital audio files.

In addition to music, many other types of audio content are now available in digital format, such as spoken-word content, news, commentary, and educational content. Audible.com is an Internet-based repository of digital spoken-word content. Digital files containing audio recordings of books being read aloud are available for download directly from their website.

Graphic content such as video and still images are also increasingly available. Digital still and video cameras allow the capture and rapid transfer of images. The Ceiva Picture Frame, provided by Ceiva Logic, of Los Angeles, Calif., is a product that allows users to share digital images across the Internet. The Ceiva Picture Frame is comprised of a frame housing similar to a conventional picture frame, but with a large LCD in place of a photograph. The device includes a microprocessor, memory, and modem The device must be plugged into a phone line, and it functions by automatically dialing-up to a server where new digital images are stored. Based on user instructions made through a setup function on a website, a group of photos are sent to, and stored on, and displayed by the device. The Ceiva Picture Frame is a costly item due to the fact that it includes a large LCD, and also because it must include enough memory to store the digital images. However, the Ceiva Picture Frame is an example of digital content delivered beyond the PC.

Internet access is also available through the use of wireless phones with Internet browsing capability and Personal Digital Assistants (hereafter PDAs) with wide-area wireless connections, such as the Palm VII, provided by Palm Computing of Santa Clara, Calif., or a Palm V with an OmniSky wireless modem, provided by OmniSky Corporation of San Francisco, Calif. The Palm VII uses the paging network, which provides among the lowest bandwidth connection available at approximately 2.4 Kbps. The OmniSky product uses the cellular wireless infrastructure which provides a maximum of 19.2 Kbps. Many wireless cellular phones now provide "wireless web" limited browsing capability. The slow data-rates provided by these products, as well as limited display area and awkward methods of user interaction, have resulted in slow adoption rates, and signals that users increasingly demand rich media experiences that can only be supported by broadband data-rates. Additionally, use of these products supports the trend of access to Internet content beyond the PC.

AvantGo, Inc. of San Mateo Calif. provides software that channels content from the Internet to a Palm Pilot handheld device through a PC with an Internet connection. The Palm Pilot must be docked in its cradle for the transfer to take place. The personal computer is used mainly as a communication link, as none of the content is stored on the computer, it passes through the PC and is stored on the Palm Pilot. The user removes the Palm Pilot from the cradle and then accesses the information from the last download on the Pilot. The AvantGo system does not provide for rich media experiences as the Palm Pilot is limited in its processing power and Palm Pilot does not leverage the processing power of the personal computer. Although the Palm Pilot with the AvantGo service is not a real-time Internet device, it does further support the trend of access to Internet content beyond the PC.

Cable, as well as satellite TV services are efficient in providing video content to a wide variety of users. However, most existing cable and satellite systems provide video delivery services on a broadcast model, that is, customers must choose from a set number of audio/video programs that are simultaneously broadcast, with the schedule determined by the broadcast networks. With the overlaying of data services over existing cable lines, there is the opportunity to provide a video-on-demand service whereby customers could order video programming of their choice at any time. However, a simple calculation will show that pure video-on-demand cannot be supported by the bandwidth available on the existing networks, due to the high data-rates required to transport high-quality video and audio in real-time.

The convergence of the digitization of content, combined with the proliferation and decreasing cost of networking and data processing components, is providing the opportunity to deliver rich content via the Internet, to a variety of inexpensive devices beyond the personal computer. What is required is a system that provides an economically optimal architecture and management system for allowing users to set up preferences for content of varying types, including rich content, and other services, to be automatically delivered to inexpensive client devices.

SUMMARY OF THE INVENTION

The present invention exemplifies the new and unobvious art of a system for delivering content, data, and application services to a variety of thin client devices. Briefly and generally, the system is used to provide a means for end users to program preference-based content for delivery at various client devices, and then to automatically or under the control of the user, send the content to client devices for presentation to the end user. Content from the Internet or otherwise digital content is accessed and cached locally in a server in the home or enterprise, so that wide area network bandwidth is optimized. The cached content is sent to thin client devices via a LAN communication link that is much faster than the wide area link, resulting in rich media experiences for the end user. The system also provides for inexpensive thin client devices, because the long term mass storage of content and data, and the processing of GUI instruction occurs at the local PC and/or storage gateway. The system for delivering content and services to thin client devices disclosed herein provides for a low total cost of delivering content beyond the PC, while insuring a high quality experience for the user in terms of audio and video quality, and simple interaction.

OBJECTS AND ADVANTAGES

Further objects and advantages of the present invention are as follows:
- (a) to provide a system where content delivery devices can be lower in cost due to the fact that mass storage, large displays, and the majority of device setup is off-loaded to the PC or PC and caching gateway.
- (b) to provide high-bandwidth content delivery with a very low overall system cost.
- (c) to provide a system that optimizes the usage of broadband bandwidth, due to the fact that content can be sent to the local caching device during times when bandwidth is least expensive, such as in the middle of the night or during mid-day.
- (d) to provide a simple system for sending Internet content to client devices beyond the PC.
- (e) to provide a system that provides economically efficient content delivery by utilizing un-used processing power and storage capacity in a user's PCs.
- (f) to provide a means for configuring content and operational preferences for a thin client device that receives Internet content, by using the convenient and optimized interface available at a PC.
- (g) to provide a device with valuable real-time interactivity with a simple, low-cost human interface.
- (h) to provide a convenient drag-and-drop graphical user interface that allows users to make content selections using a web page and a local application.
- (i) to provide a system whereby content that is specifically preferred by an end user is automatically retrieved and stored on a local storage device for delivery at a pre-scheduled time or regularly scheduled interval.

(j) to provide a system that allows single button activation interactivity by the end user.

(k) to provide a system that allows users to gain access to information related to content they experience on thin client devices while engaged in other activities that make browsing at the very moment of experiencing the content impractical or inconvenient.

LIST OF DRAWING FIGURES

FIG. 1. shows a block diagram of the system at the highest level.

Figure 2:
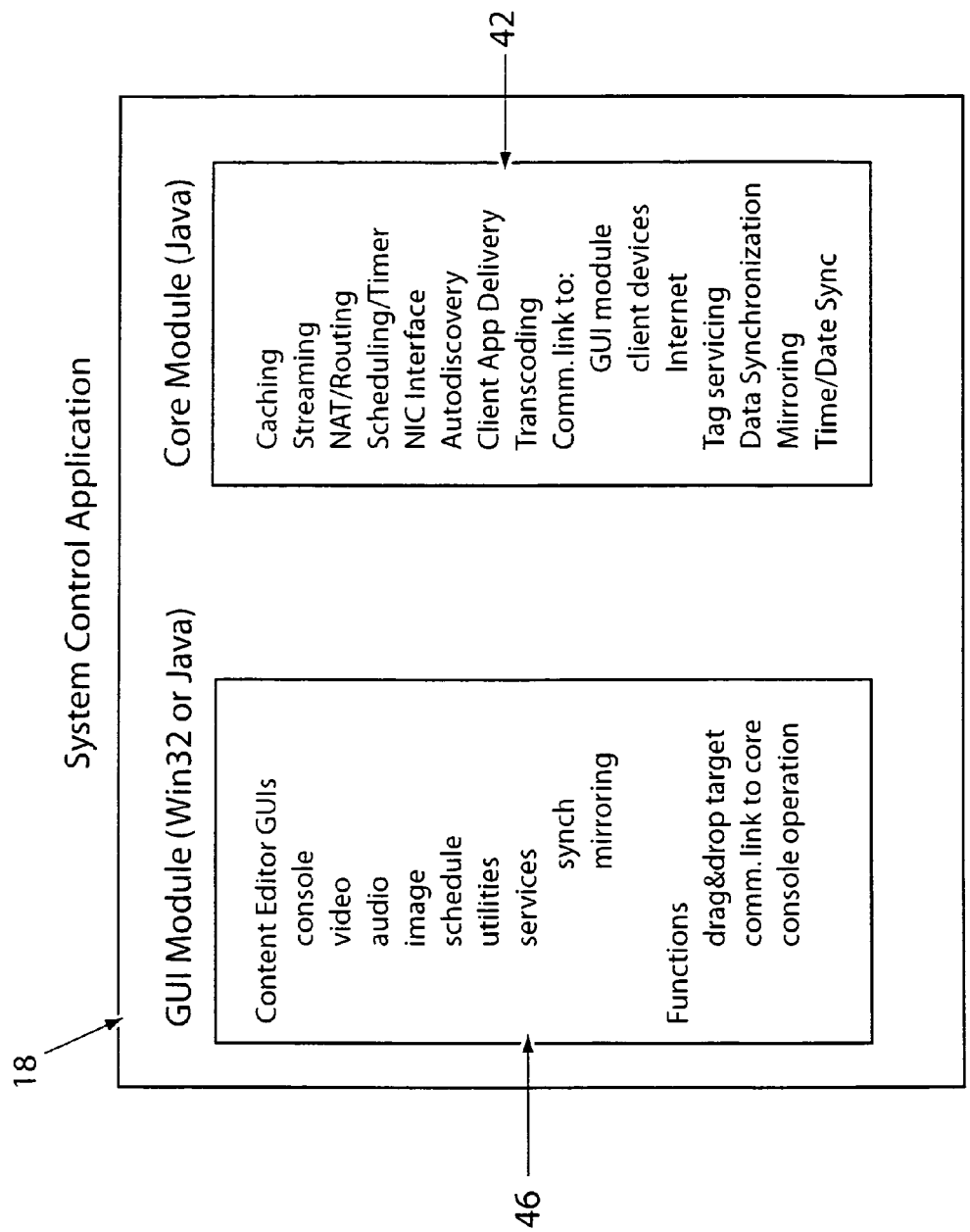

FIG. 2. shows a block diagram of the system control application.

Figure 3:
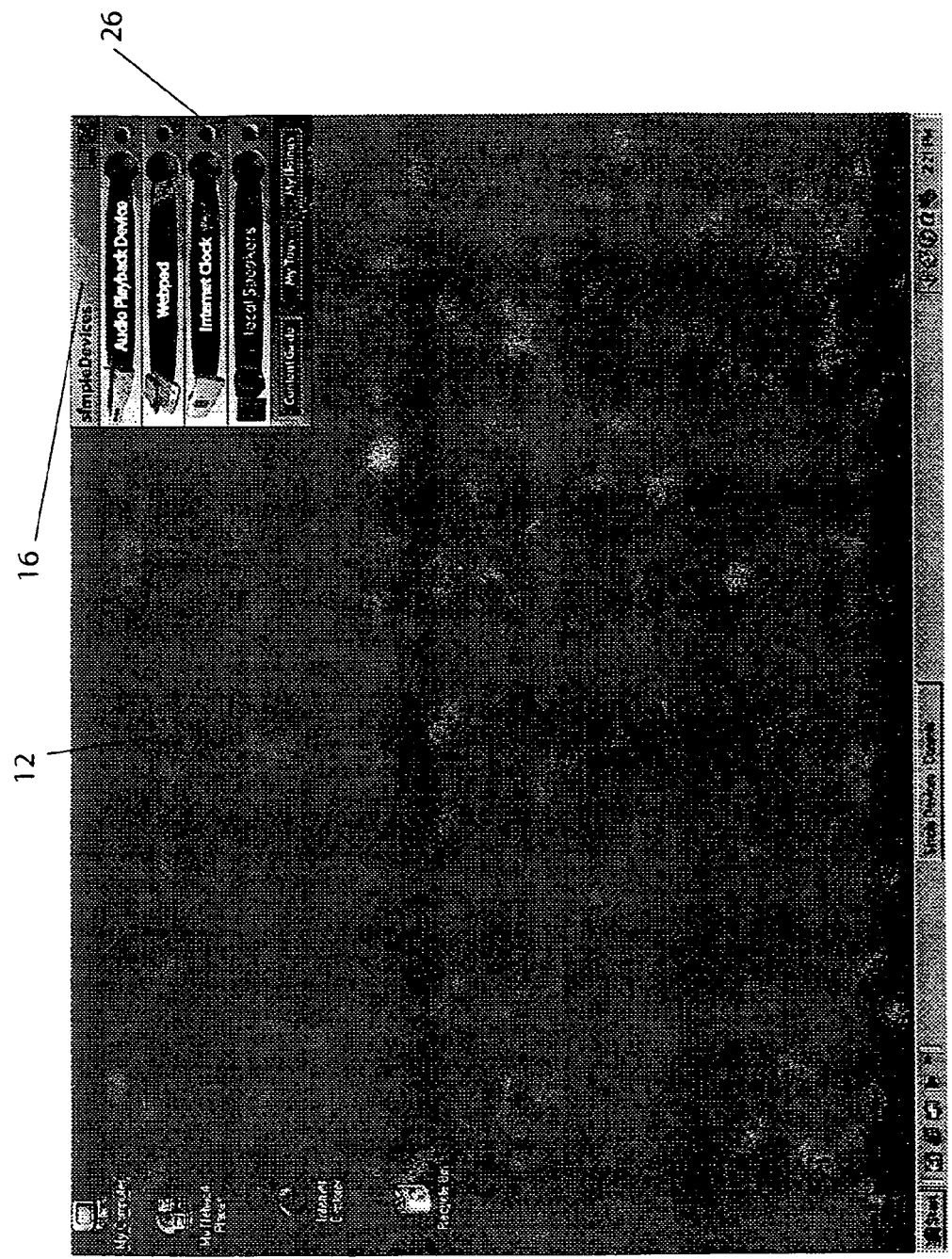

FIG. 3. shows an example console GUI on the PC desktop.

Figure 4:
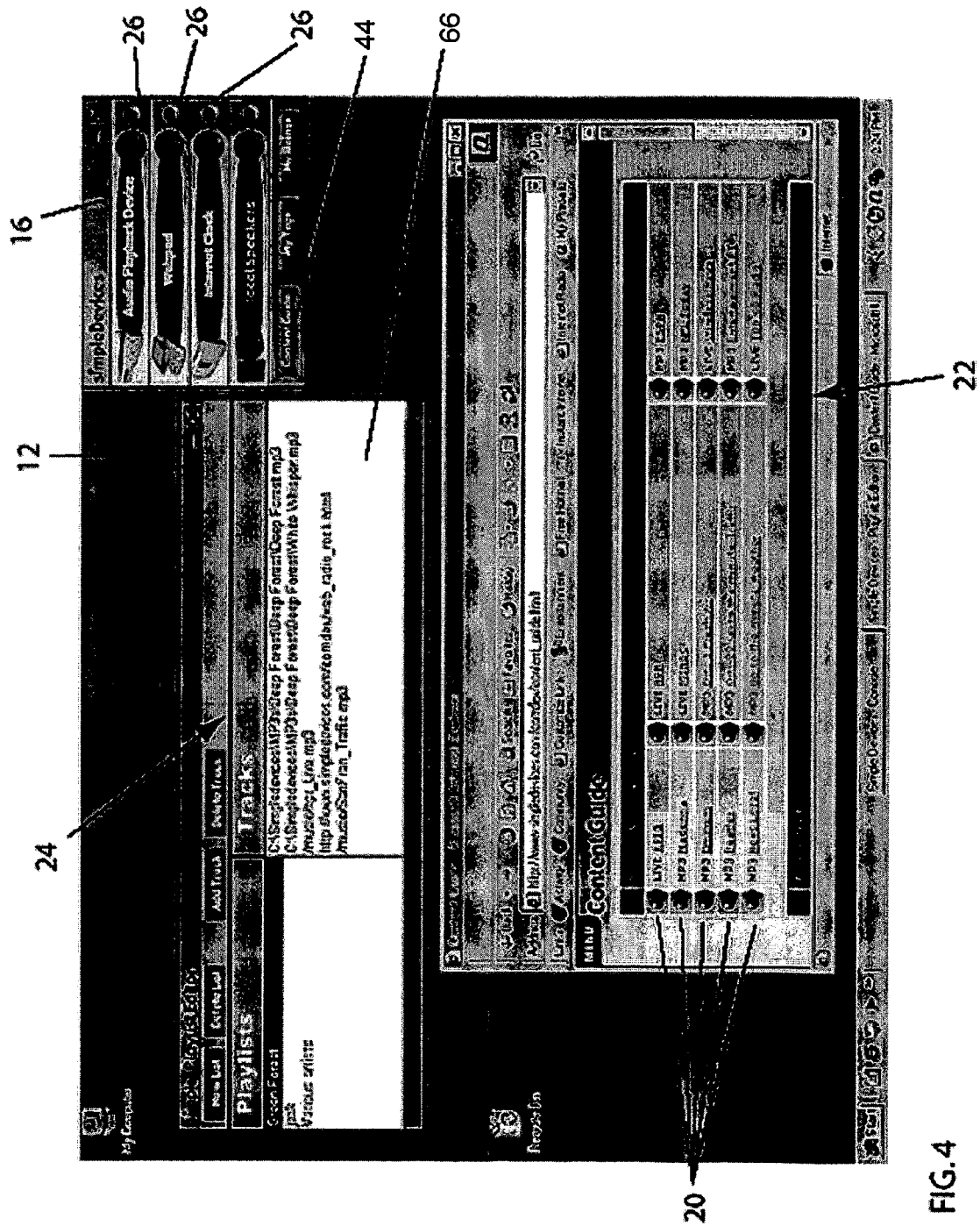

FIG. 4. shows the web-based content guide GUI window and the audio device content editor GUI on a PC display desktop window.

Figure 5:
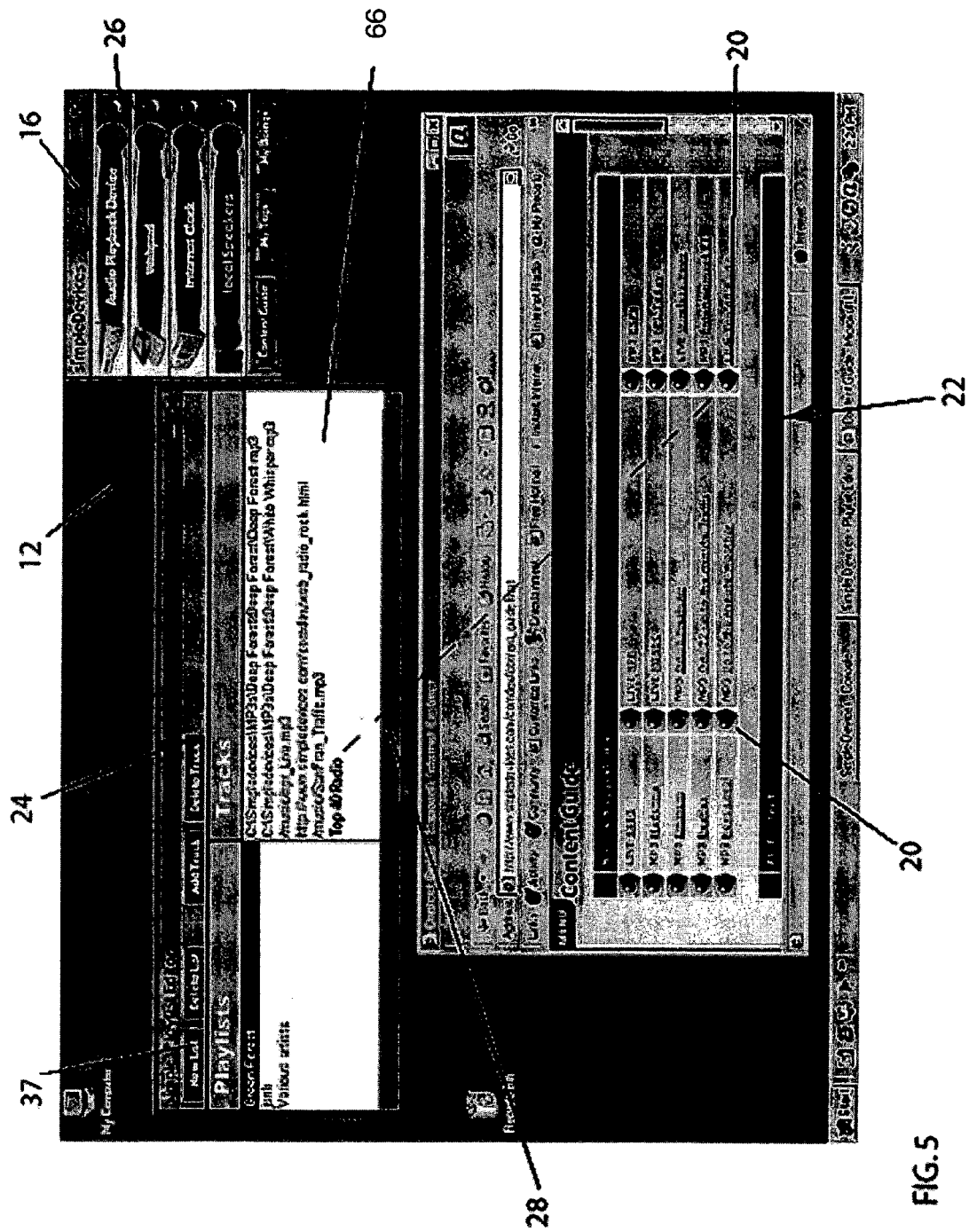

FIG. 5. shows the web-based content guide GUI window and the audio device content editor GUI after a content object has been dragged and placed.

Figure 6:
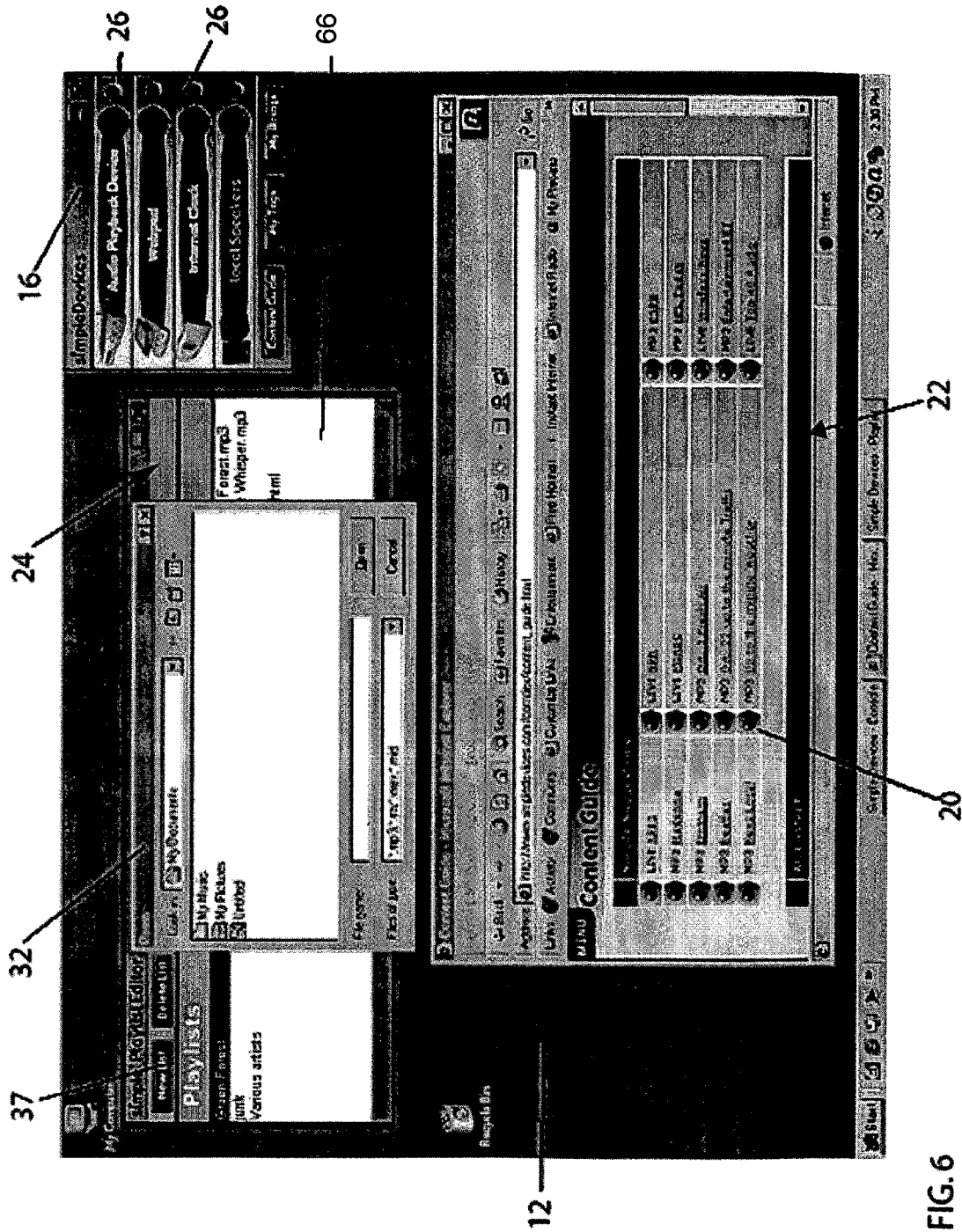

FIG. 6. shows the web-based content guide GUI window and the audio device content editor GUI with a dialog box launched.

Figure 7:
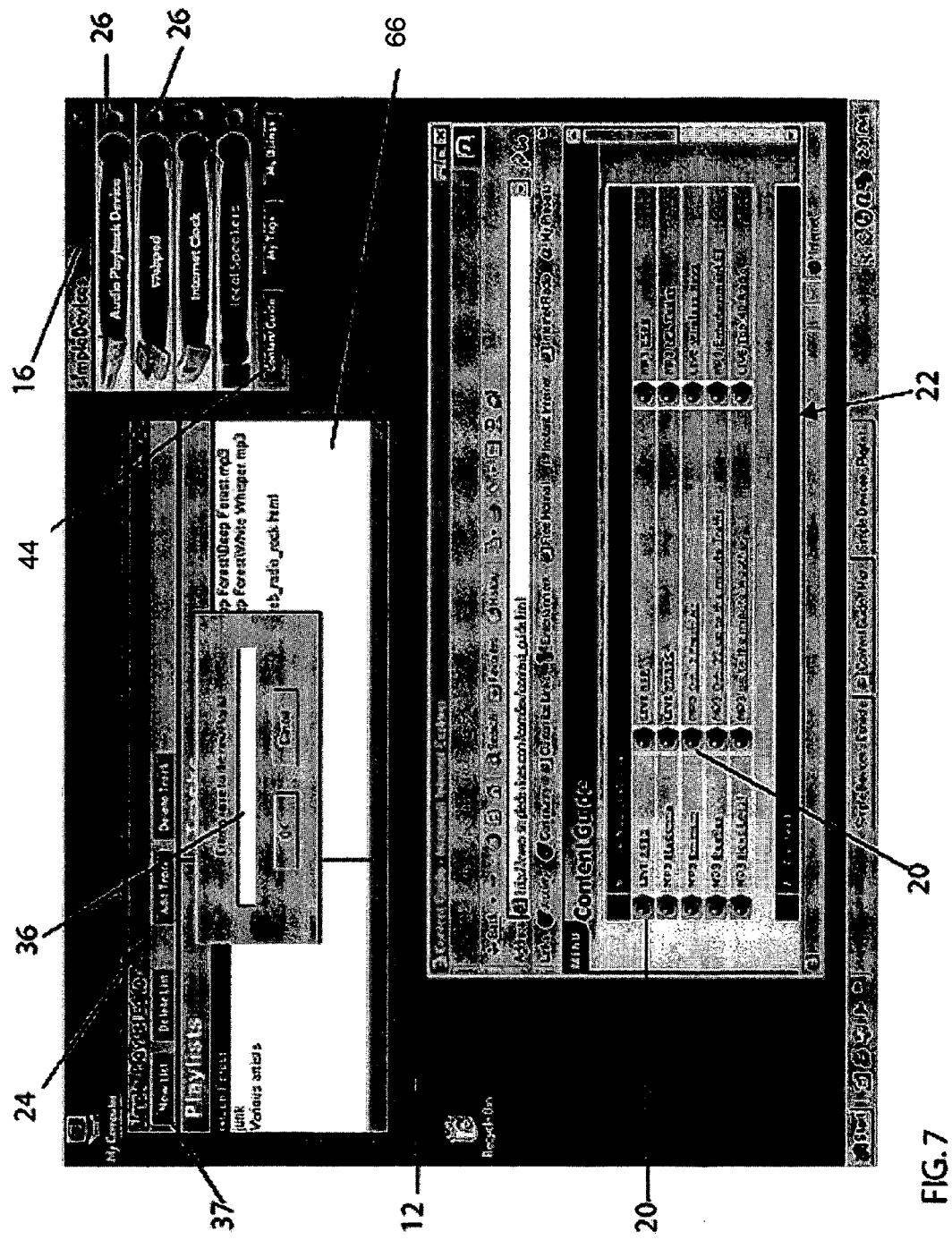

FIG. 7. shows the web-based content guide GUI window and the audio device content editor GUI with the "new playlist" text box open.

Figure 8:
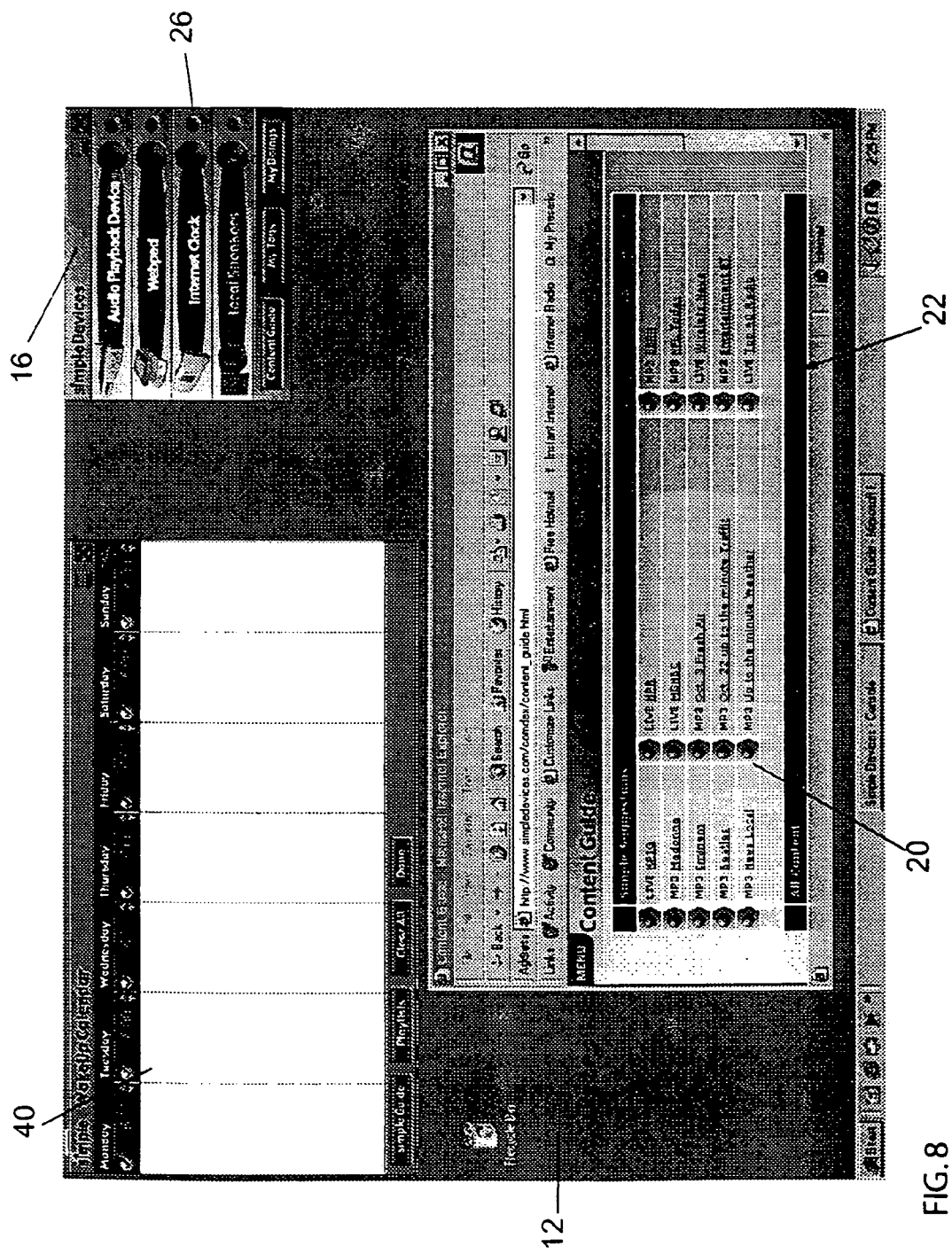

FIG. 8. shows the web-based content guide GUI window and the Internet clock content editor GUI.

Figure 9:
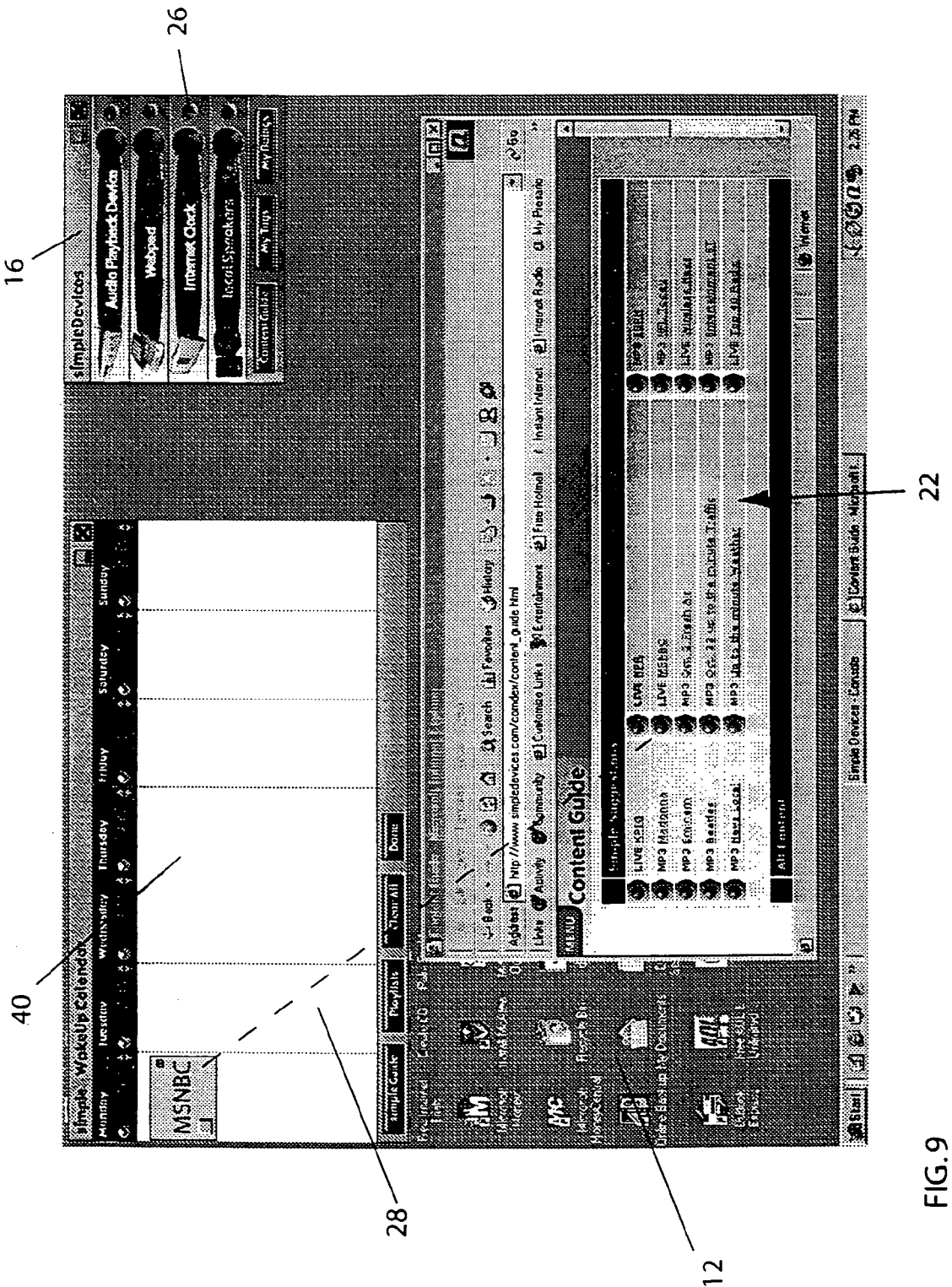

FIG. 9. shows the web-based content guide GUI window and the Internet clock content GUI after a content module has been dragged and placed.

Figure 10:
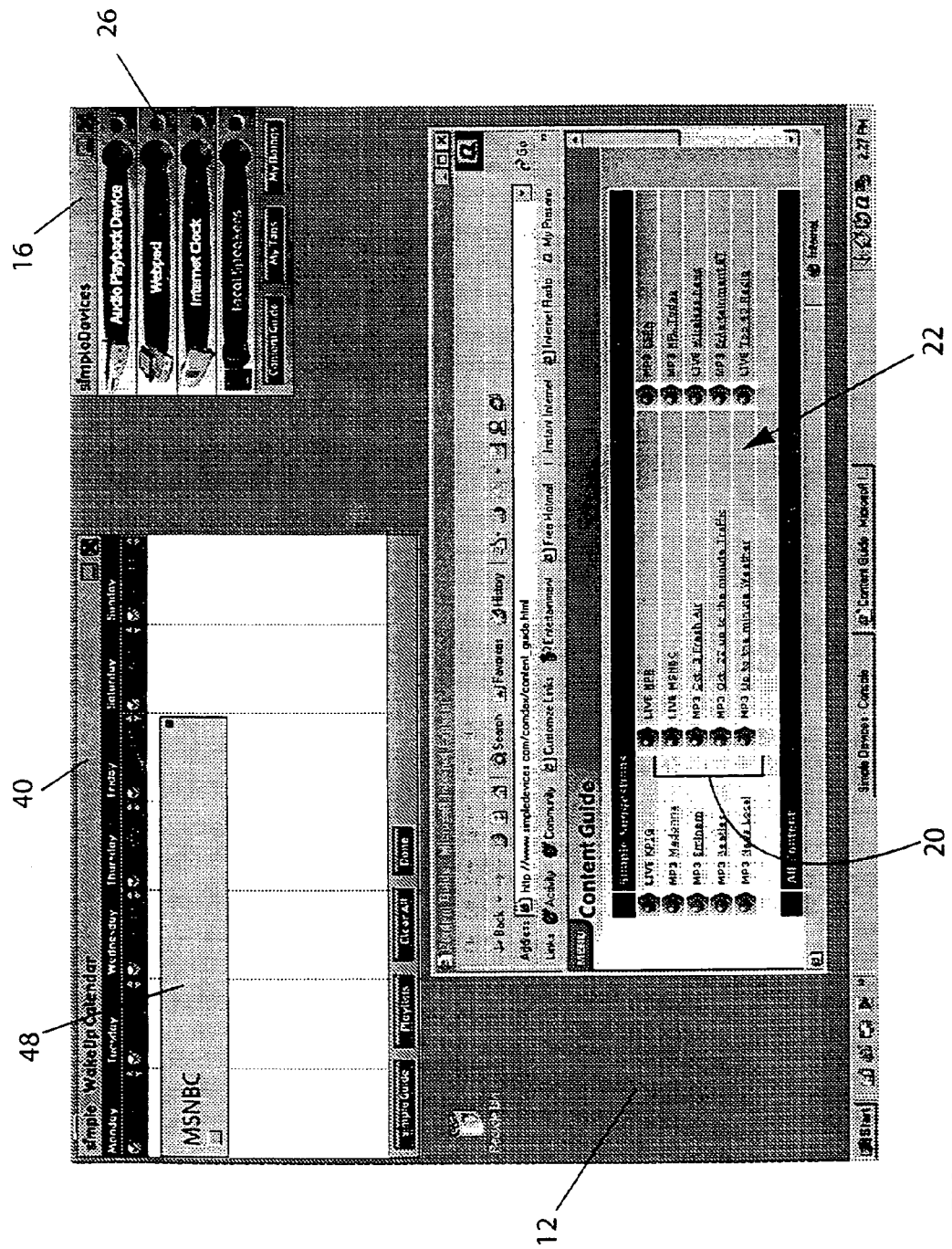

FIG. 10. shows the web-based content guide GUI window and the Internet clock content GUI after a content module has been expanded from "Monday" to "Friday".

Figure 11:
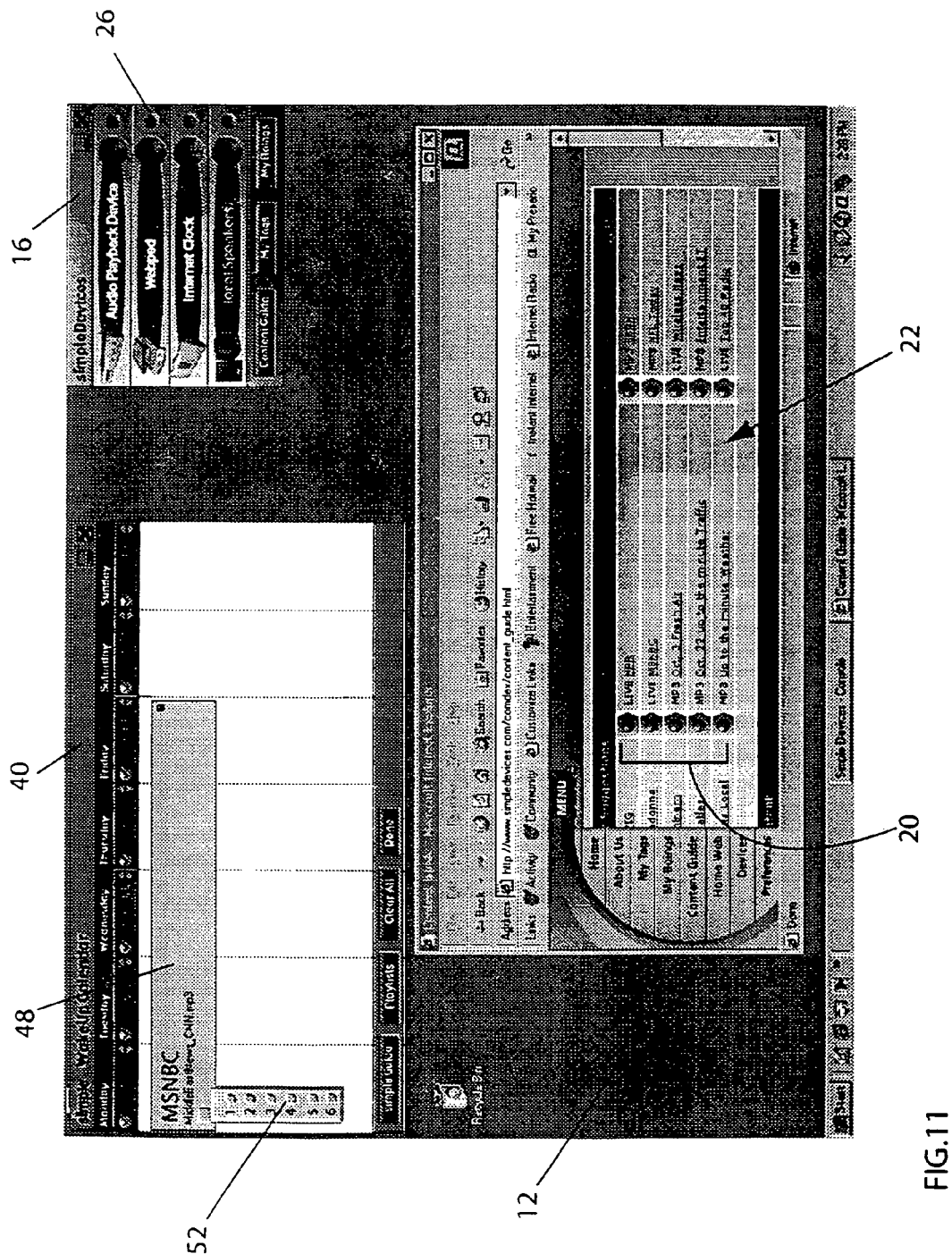

FIG. 11. shows the web-based content guide GUI window and the Internet clock content GUI and the softkey assignment pop-up menu.

Figure 12:
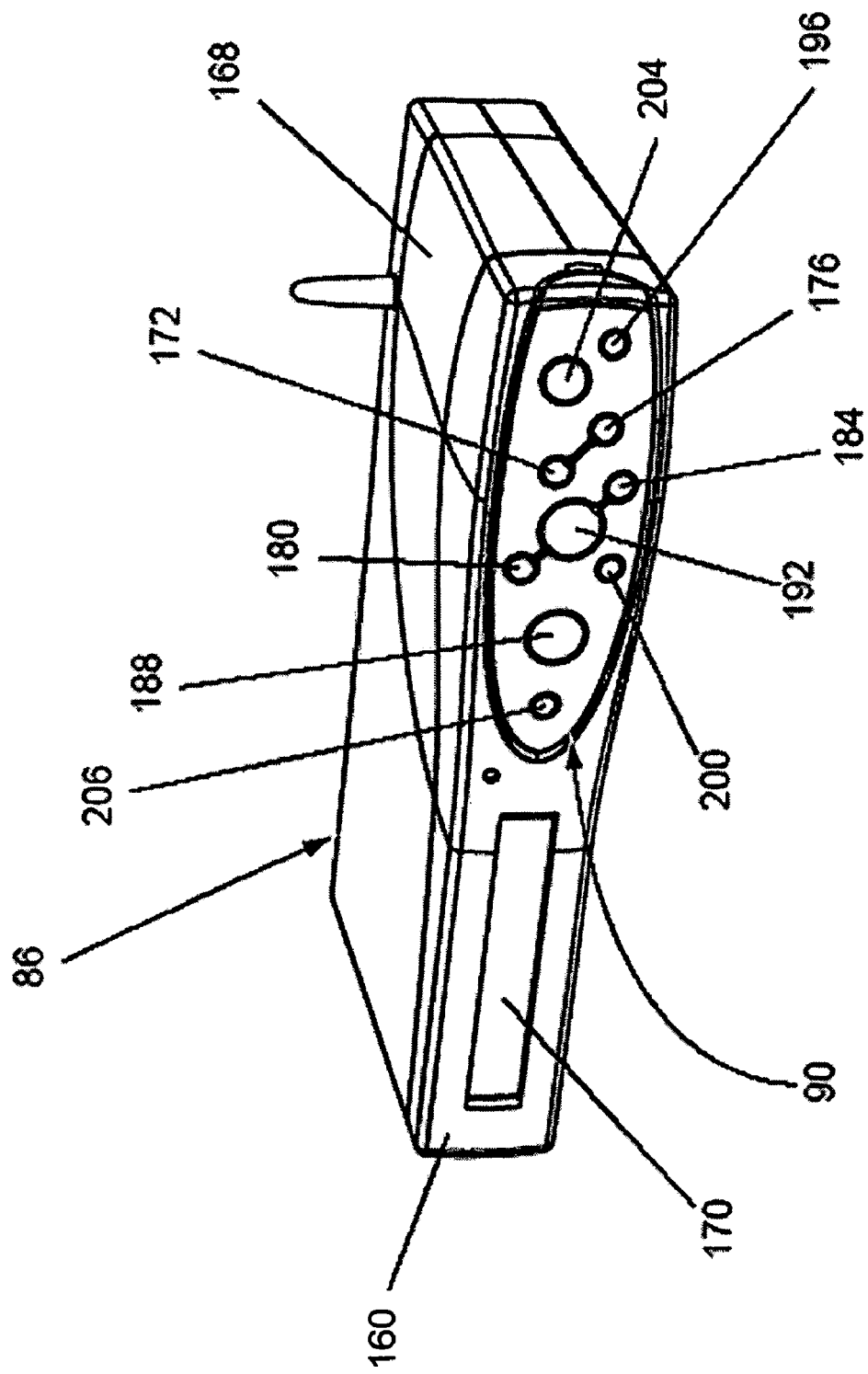

FIG. 12. is an isometric view of the audio playback device.

Figure 13:
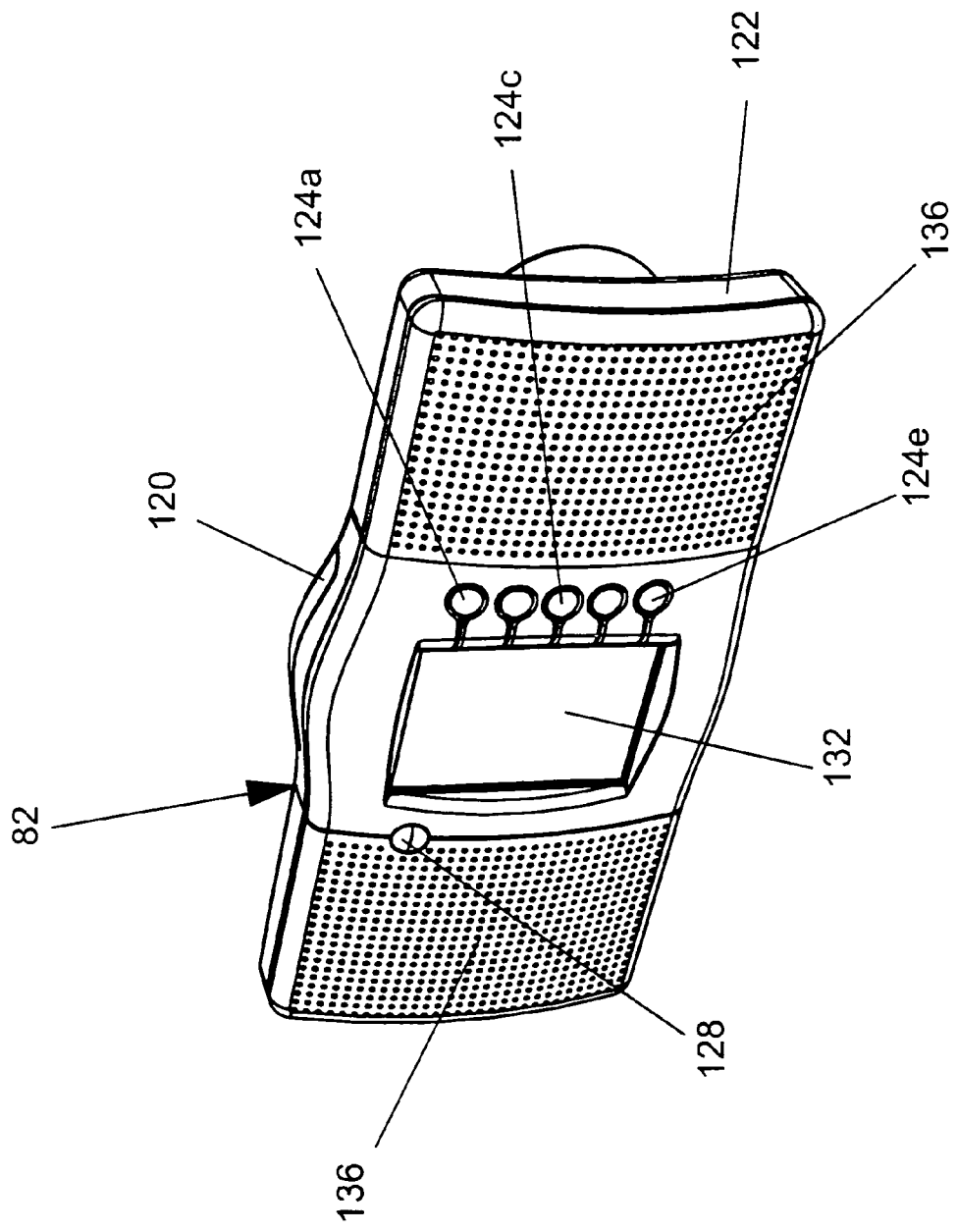

FIG. 13. is an isometric view of the Internet clock.

Figure 14:
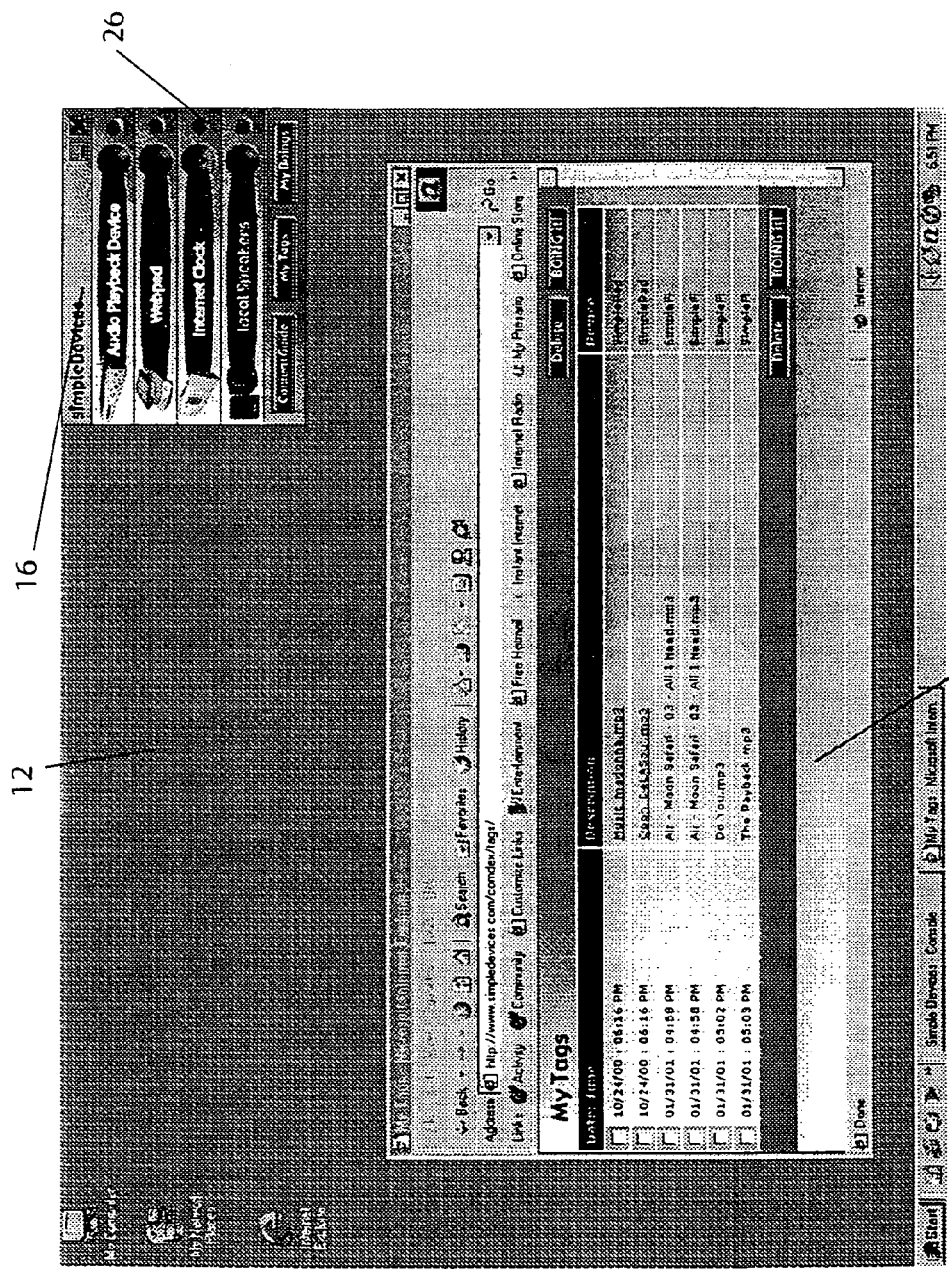

FIG. 14. shows a tag aggregation web page.

Figure 15:
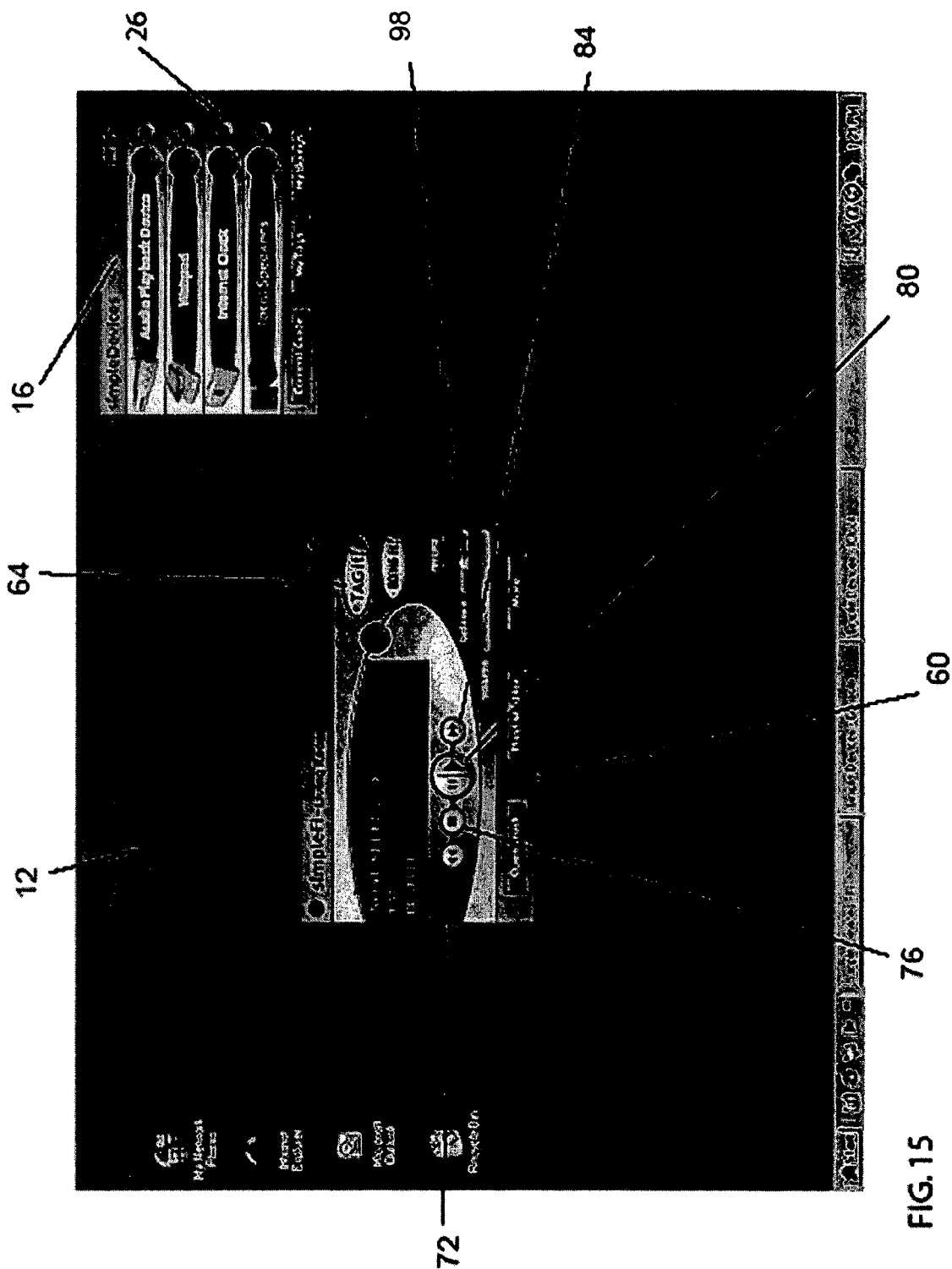

FIG. 15. shows a PC desktop with the console and the audio device controller.

Figure 16:
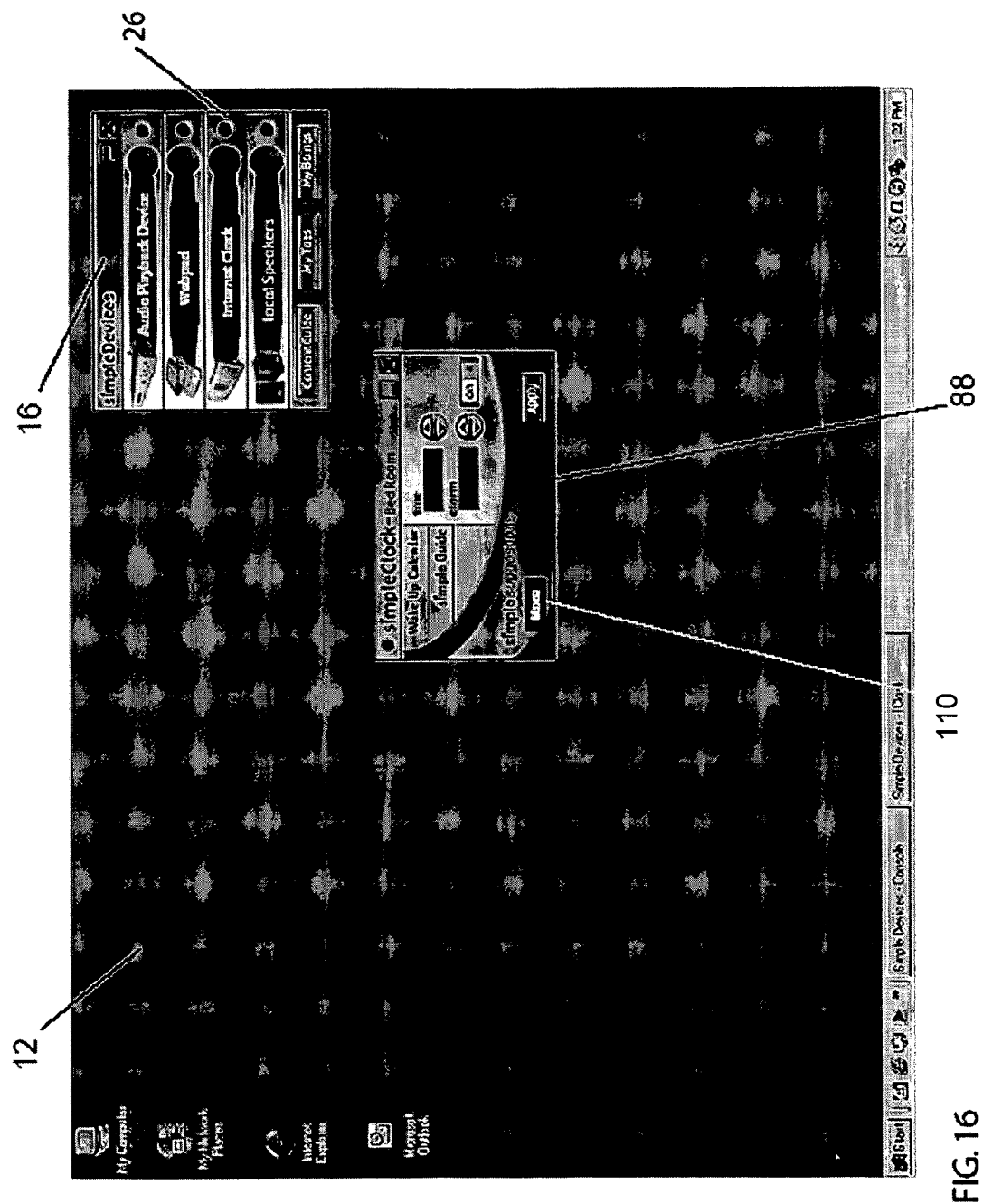

FIG. 16. shows a PC desktop with the console and the Internet clock controller.

Figure 17:
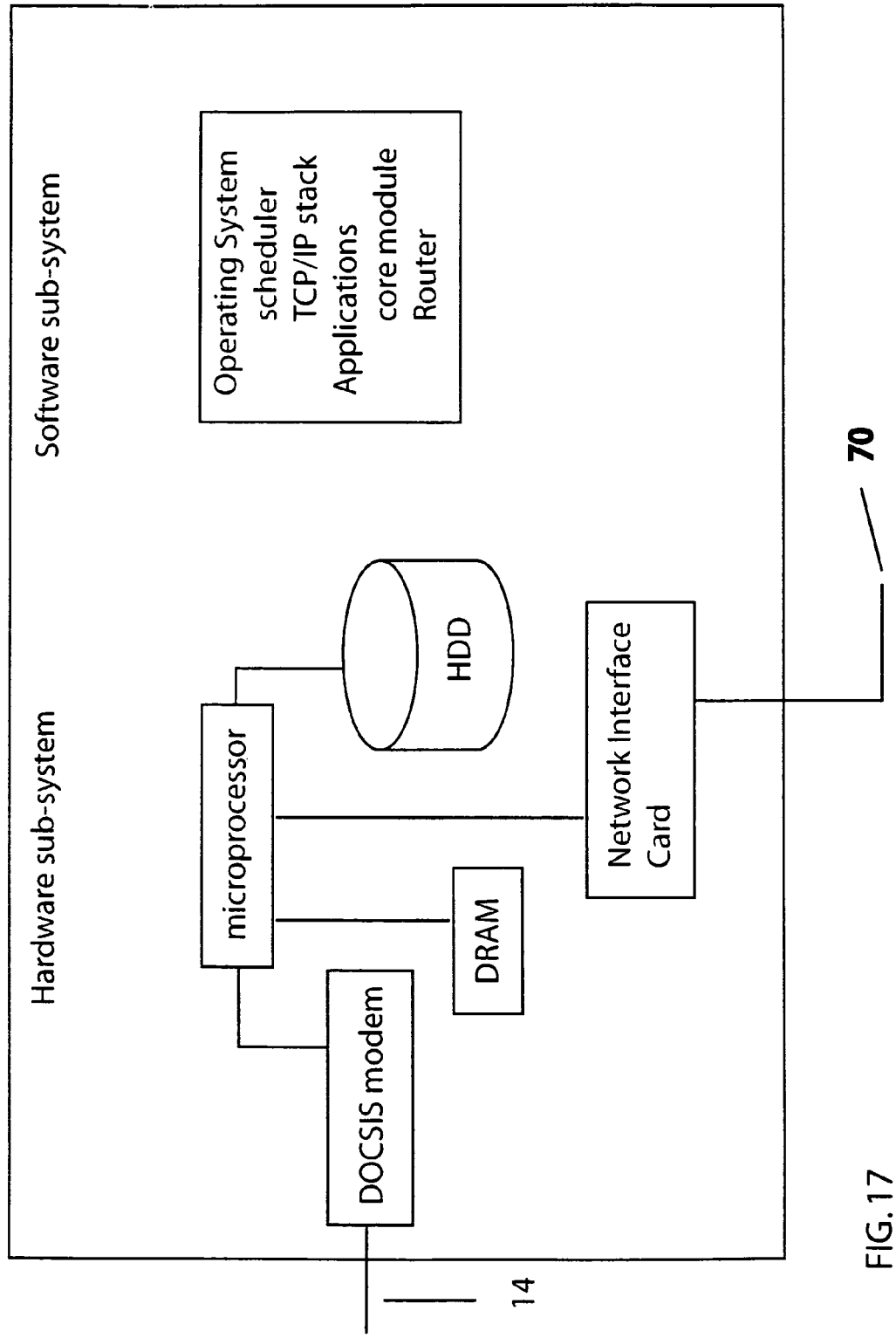

FIG. 17. shows a functional block diagram of a storage gateway.

Figure 18:
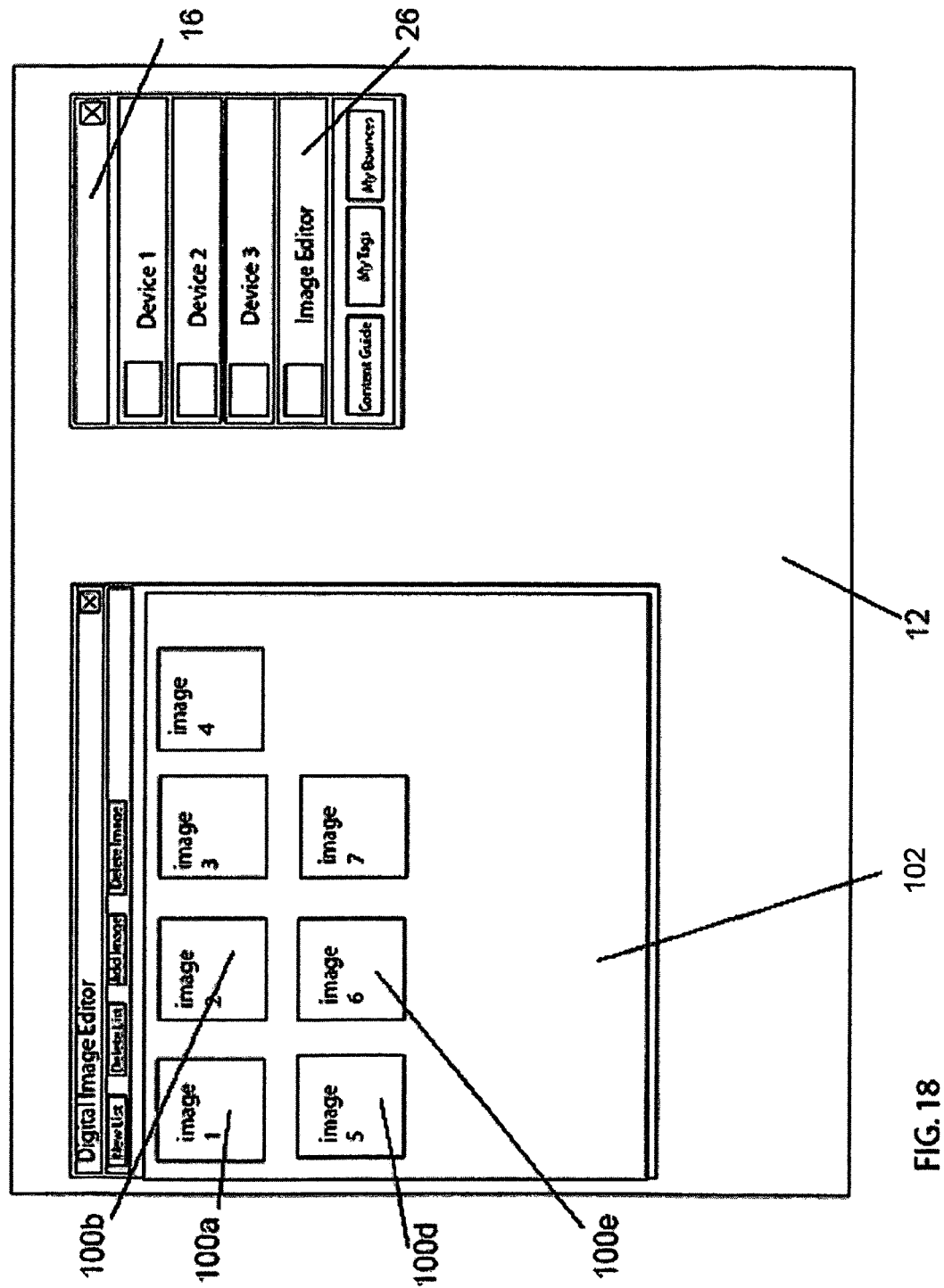

FIG. 18. shows a digital image editor GUI.

Figure 19:
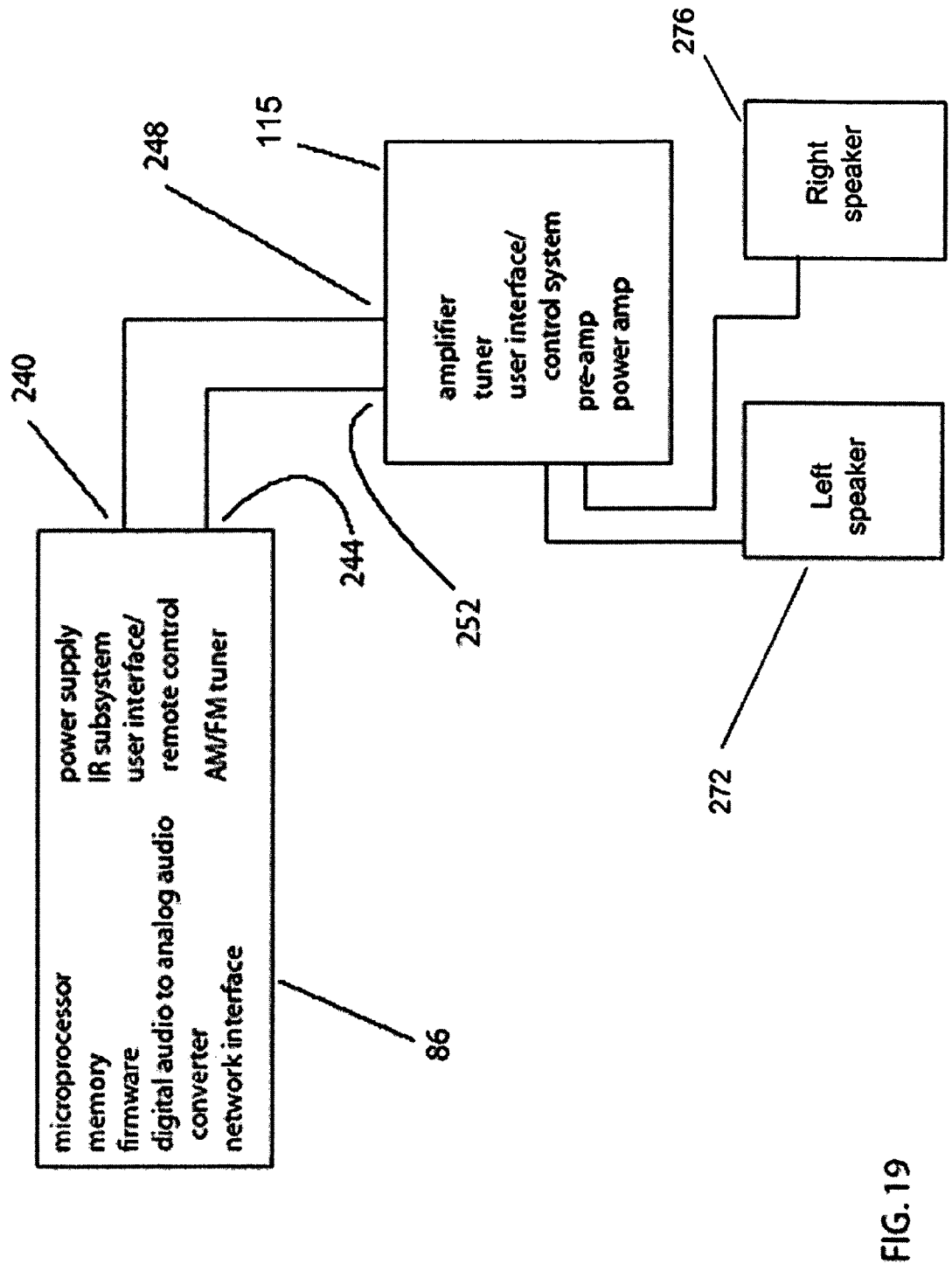

FIG. 19. shows a block diagram of the audio playback device/stereo system.

Figure 20:
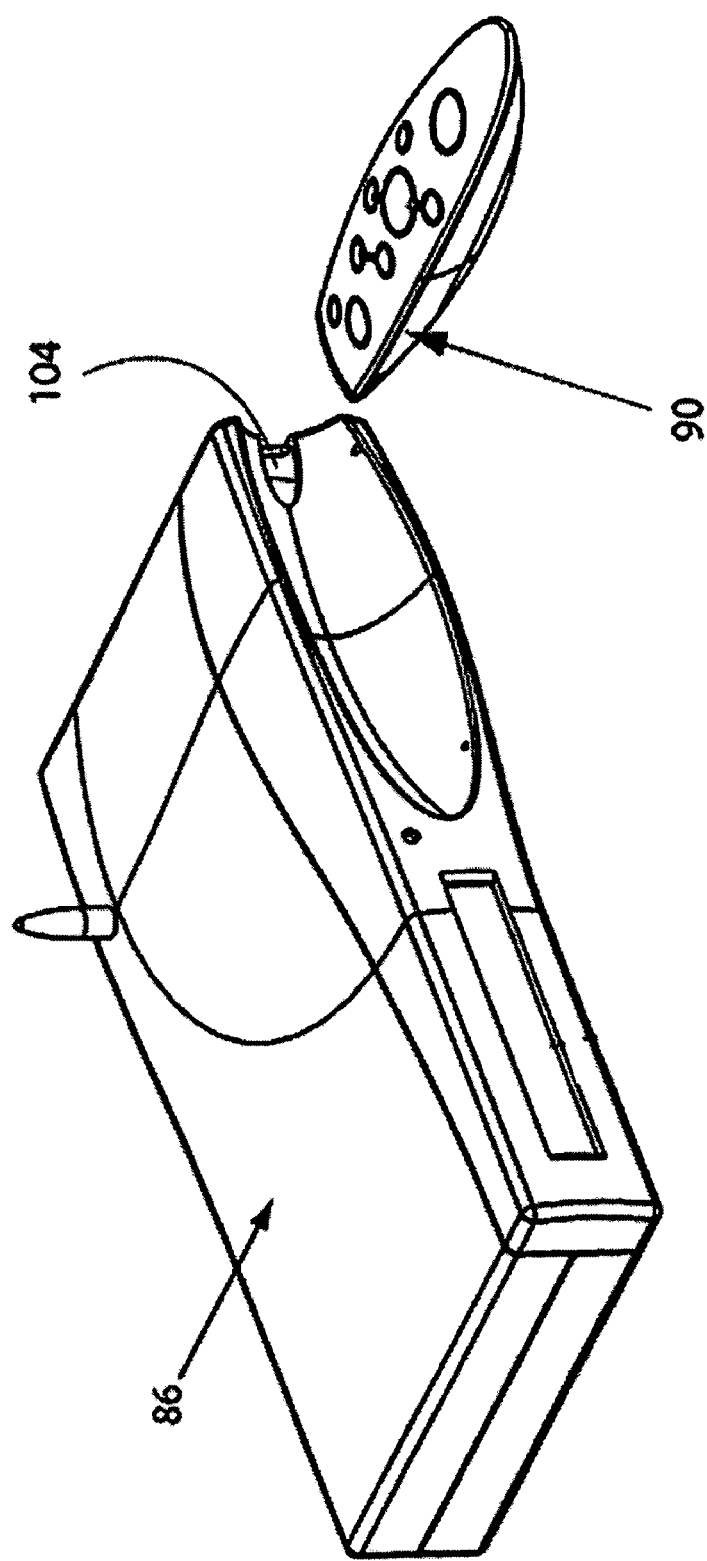

FIG. 20. shows the audio playback device with the remote control removed.

Figure 21:
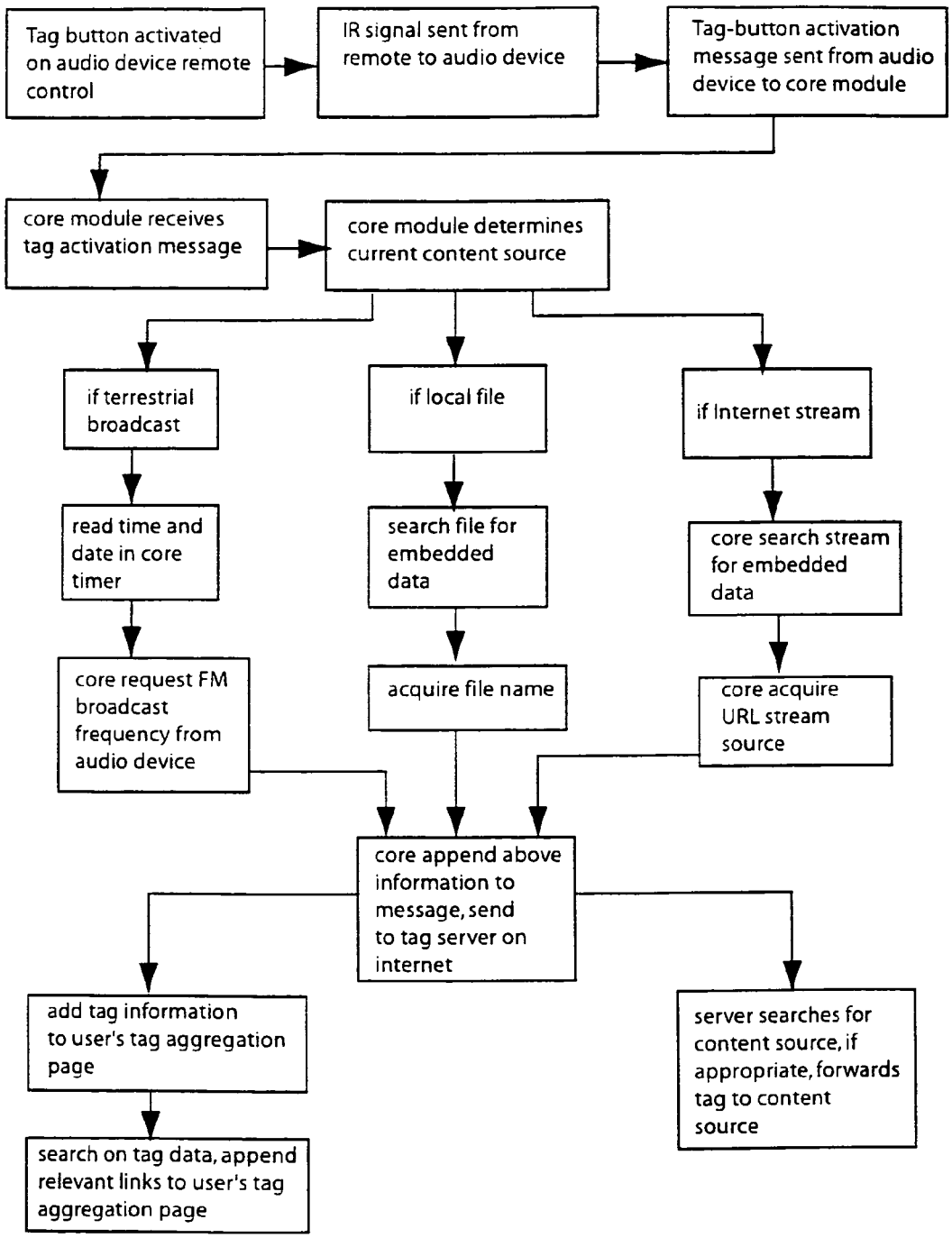

FIG. 21. is a block diagram of the tag response sequence.

Figure 22:
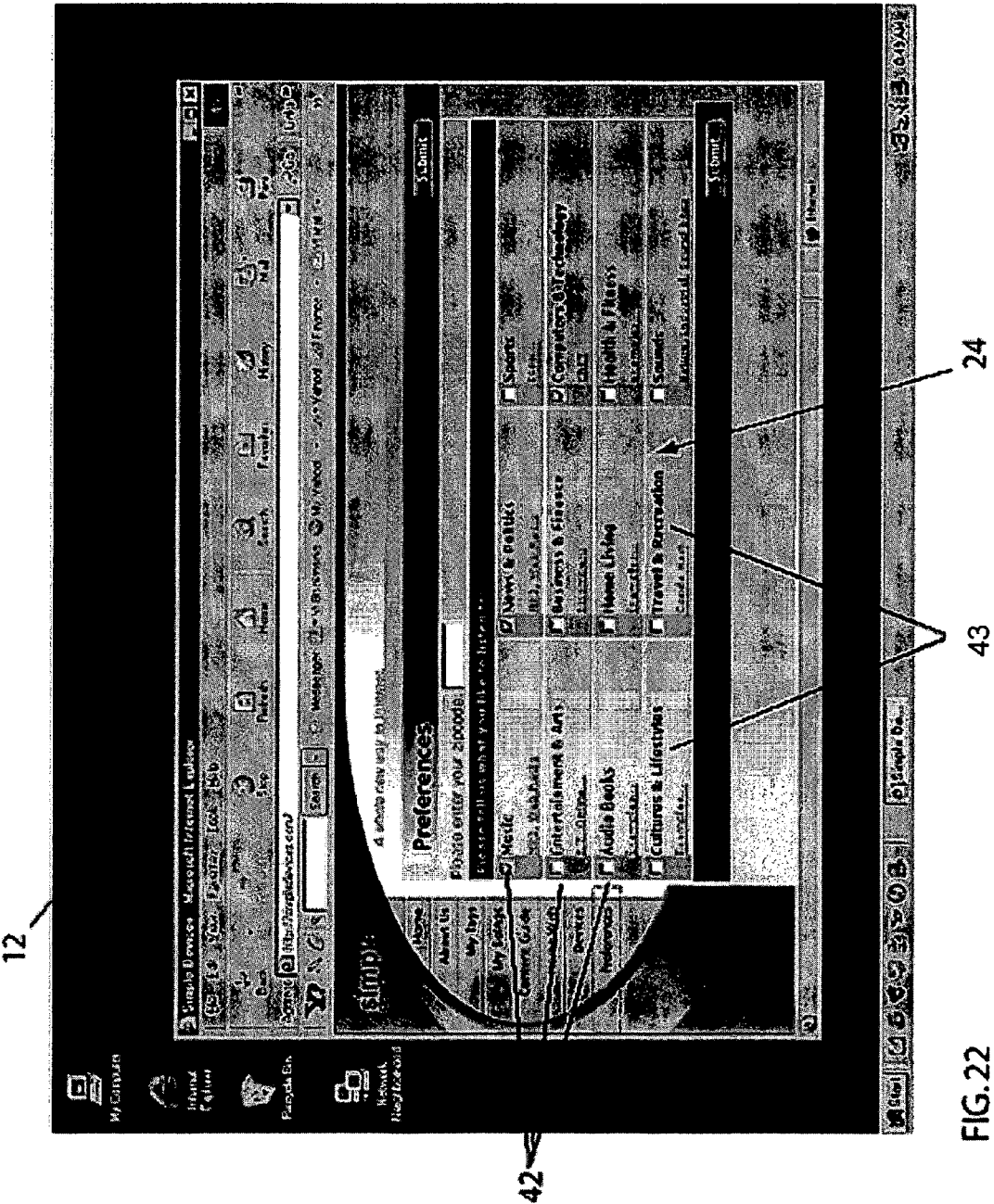

FIG. 22. shows a PC desktop with a content preference selection web page.

Figure 23:
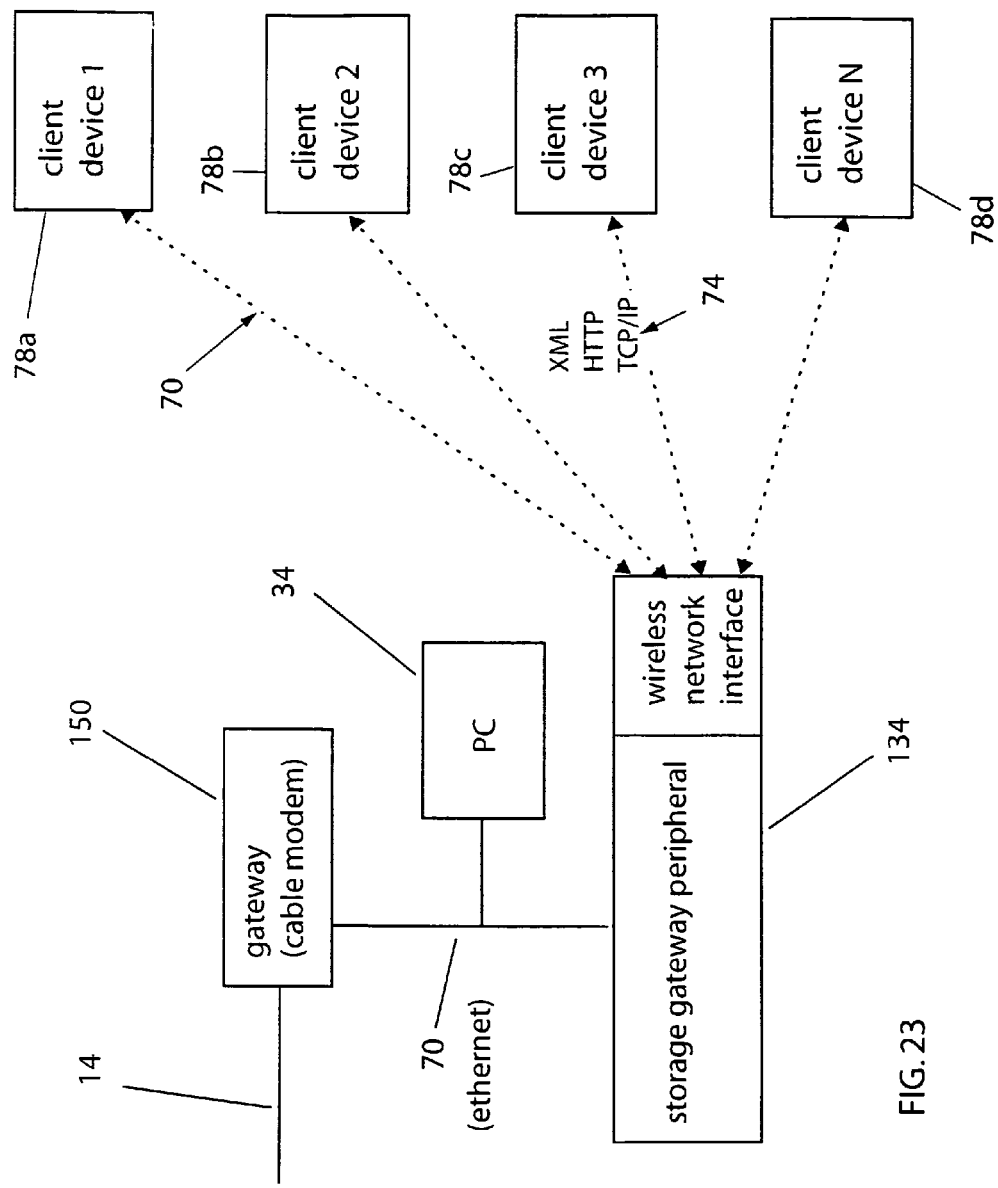

FIG. 23. shows a system block diagram including a storage gateway peripheral.

Figure 24:
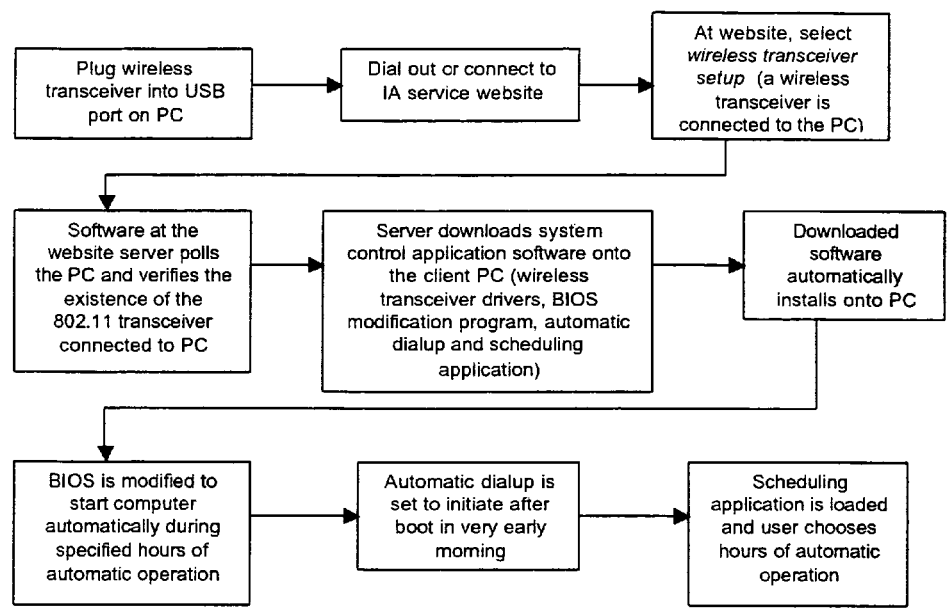

FIG. 24. is a home PC storage server setup flowchart.

Figure 25:
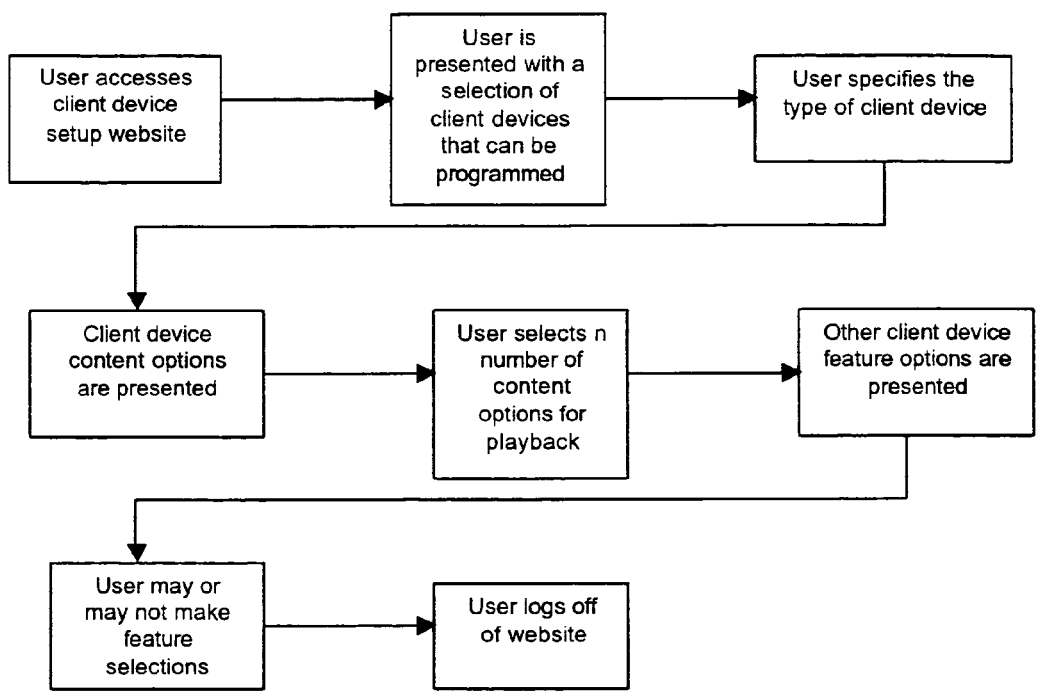

FIG. 25. is a flowchart showing the process of programming client device content on a website.

Figure 26:
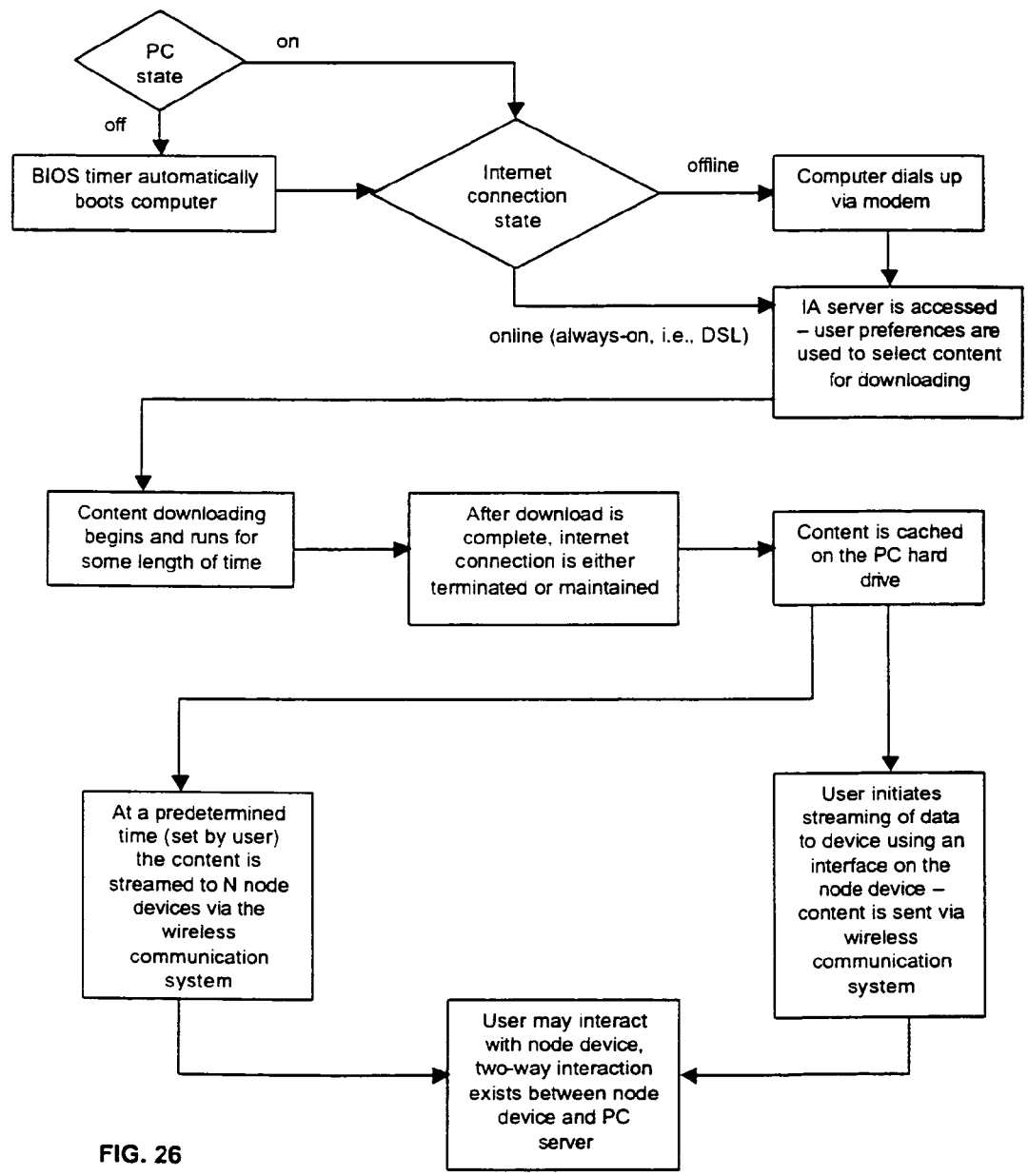

FIG. 26. is a home PC storage server operation sequence.

Figure 27:
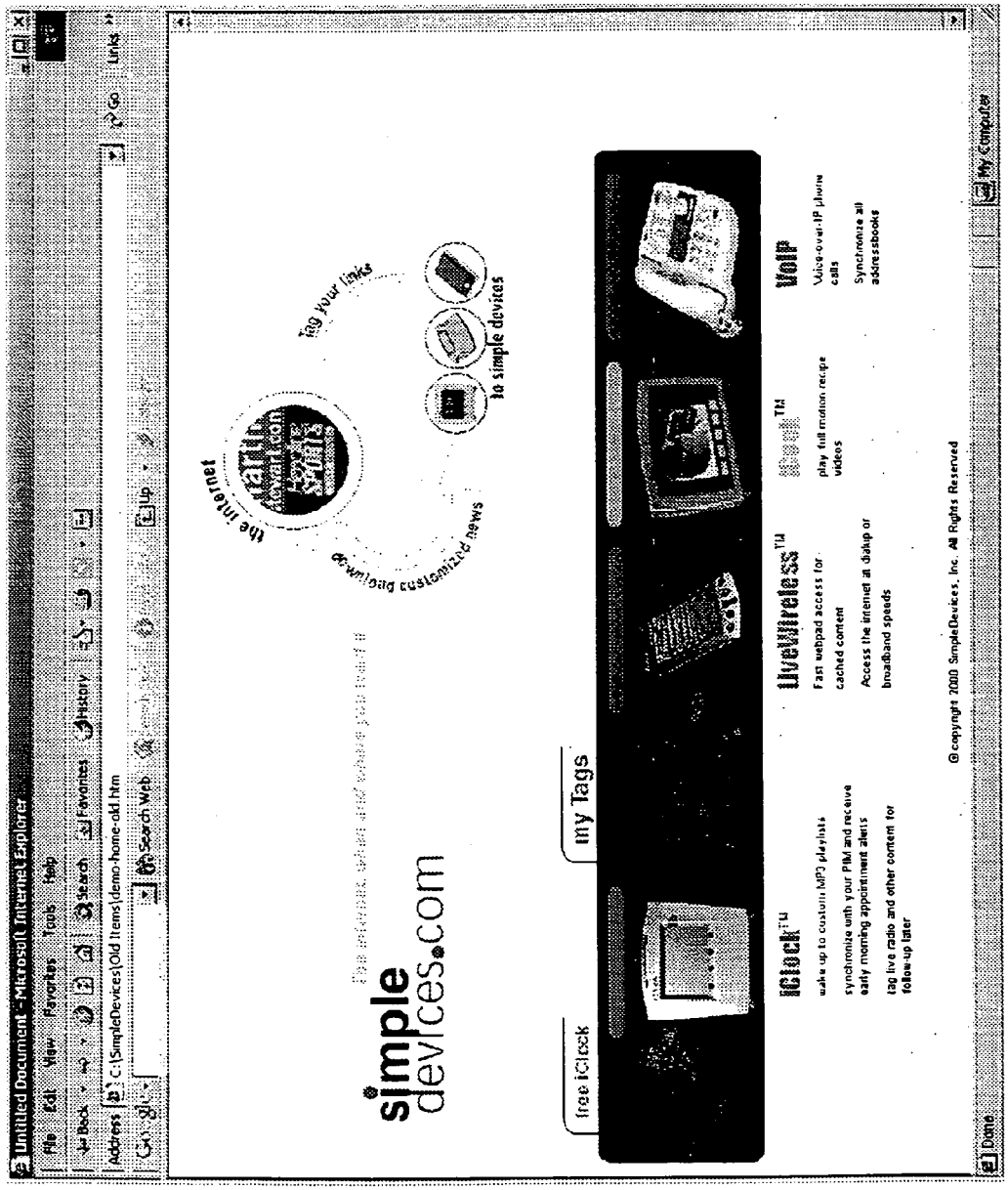

FIG. 27. is an image of a webpage for selecting the client device to program.

Figure 28:
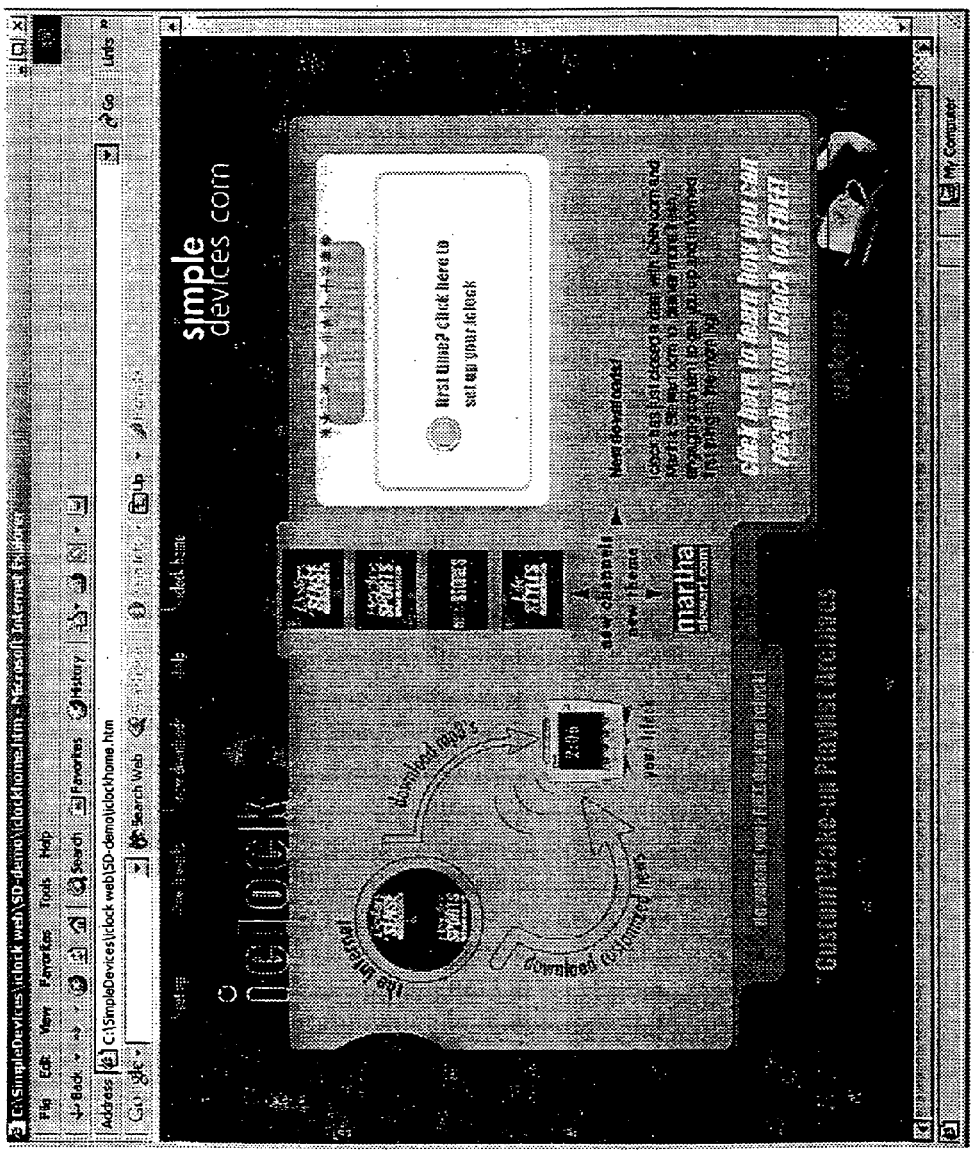

FIG. 28. is an image of webpage which is a first setup page for an Internet clock.

Figure 29:
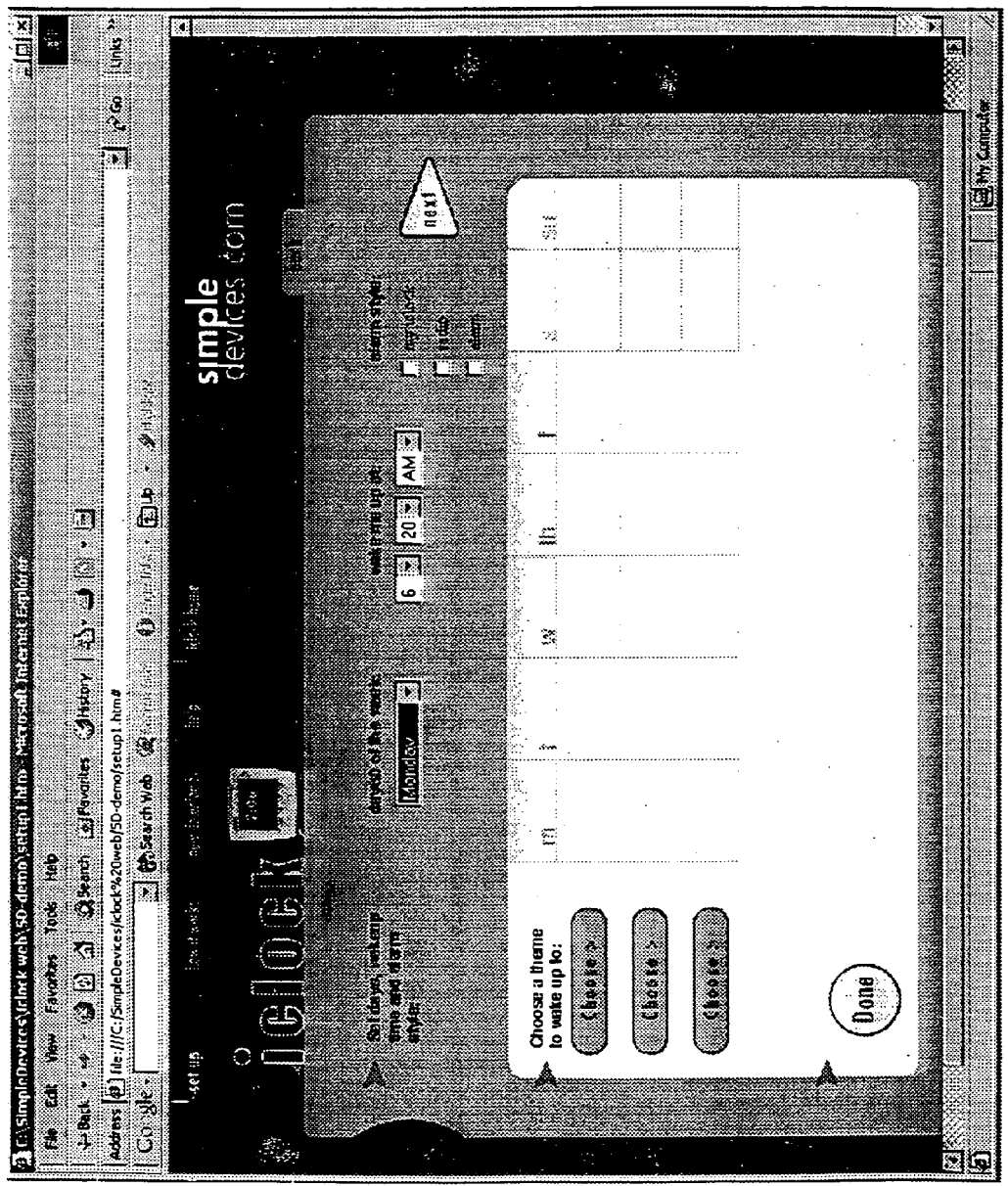

FIG. 29. is an image of a webpage for programming the content for an Internet clock.

Figure 30:
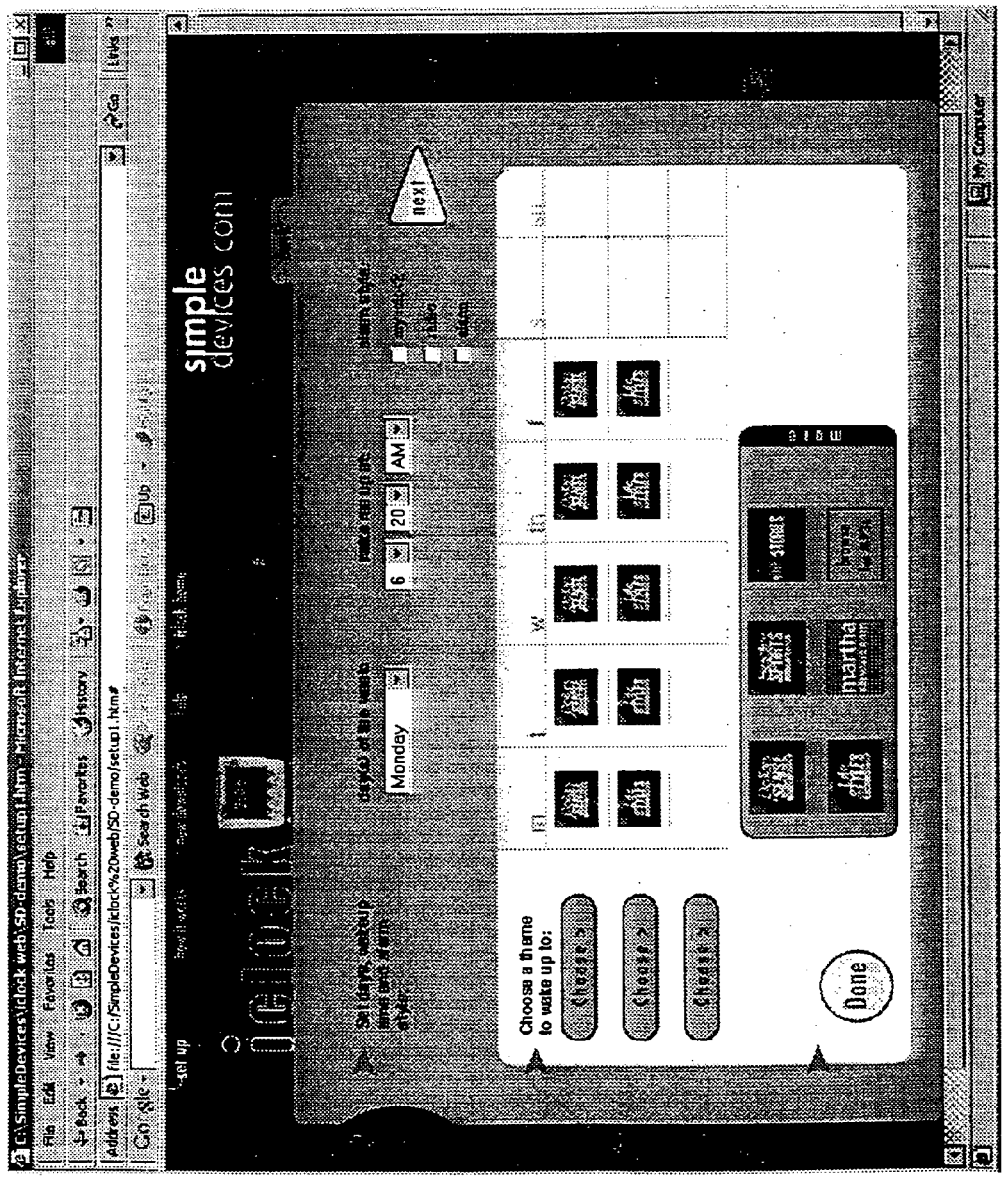

FIG. 30. is an image of a webpage showing the results of a users selection of content for an Internet clock.

DESCRIPTION OF PREFERRED EMBODIMENT

First a description of the various components of the system is provided, then a description of the three functional modes. It should be noted that the functionality of the software and hardware pertinent to the invention disclosed in this document is described at several levels including at the interface level (what the end user sees and experiences) and at the action level (software and hardware interactions involving digital messages, content, and data). It is assumed that software engineers of reasonable ability would be able to program the functions described here using common programming languages and tools such as C, C++ and Java programming languages, and Microsoft Foundation Classes (MFC), and other tools and development systems for other operating system such as VxWorks and Linux. Details of the software architecture are given when it is deemed to aid in the complete disclosure of the system.

The system disclosed herein provides a communication connection and a content and data management system comprised of software and hardware on three different computing platforms: (1) the Internet 8, (2) a local PC 34 or PC 34 and a storage gateway 38, and (3) the local client devices 78*a, b, c,* and *d*. FIG. 1 shows a schematic of the invention disclosed here. PC 34 is a conventional computer including a microprocessor, system memory, hard disk drive 30, display, keyboard, and mouse, and runs the Windows operating system, provide by Microsoft of Redmond, Oreg. PC 34 also includes a Universal Serial Bus (hereafter USB) port for connecting peripheral devices. PC 34 is connected to content and data 10 on Internet 8 via a wide area network broadband communication link 14 that provides data delivery rates ranging from 500 kbps to 3,000 kbps. Broadband communication link 14 is well known in the telecommunications and computer industry, thus the connection technology will not be described in greater detail. In the preferred embodiment, broadband connection 14 is maintained by DOCSIS storage gateway 38. FIG. 17 shows a block diagram of the functional hardware and software components of storage gateway 38. Hard disk drive 30 is combined with a conventional DOCSIS cable modem and a HomeRF LAN transceiver 50. These subsystems are controlled by a computer comprised of a microprocessor 280, and the SDRAM 284 running an operating system, such as VxWorks provided by WindRiver Systems of Alameda, Calif. The core module 42 software application described below, runs on and functionally connects storage gateway 38 to the other system components.

Referring again to FIG. 1, in the preferred embodiment, the high-speed LAN connection 70 between PC 34, storage gateway 38, and devices 78, is a HomeRF wireless network. The communications protocol between PC 34 and Internet 8 is HTTP and TCP/IP. The GUI module 46 software aspect of system control application 18 exists on PC 34. In the preferred embodiment, core module 38 aspect of system control application 18 exists and is run on both storage gateway 38 and on PC 34. The communication message structure between client devices 78 and PC 34 and storage gateway 38 are XML formatted messages 74 sent over HTTP.

Web Content Guide

Referring again to FIG. 1, content and data 10 on Internet 8 is expressed on web pages as an organization of text and graphical information, some of which is configured as interactive hyperlinks, all of which are formatted using HTML for presentation to end user's PCs 34 via HTTP communication protocols. A content selection web page 22 shown in FIG. 4 through FIG. 11. The graphical interactive representation of the portal to the end user is as a series of hyper-linked web pages and hyper-linked text and images. The physical manifestation of the portal is that of software and data stored on servers located at various and disparate physical locations, but connected by Internet 8.

Content 10 on Internet 8 is arranged for delivery to local client devices 78*a, b, c,* and d by a system that allows for graphical icons, referred to in this disclosure as content objects 20, that exist on content selection web page 22, to be dragged and dropped onto content editors on a PC 34. Drag and droppable content object 20 is a graphical representation of a file system path that points to a digital content file stored locally on hard disk drive 30 on PC 34 or on storage gateway 38, or on a server on Internet 8, or is the graphical designation of a URL or IP address and port number of an digital content stream originating on a server on Internet 8. The purpose of the portal is to simplify and facilitate the discovery and selection of content 10 from Internet 8 for later use on client devices 78.

Content selection web page 22 capability may include, but is not limited to the following functionality:
1) Presentation and organization of content and or links to content according to file type (e.g. MP3, MPEG, and the like), and or according to genre (e.g. music or video).
2) Further sub classification of content within file types or genres. For example a "music" category may be further divided into additional classifications such as "classical", "jazz", "pop", "internet radio" and the like.
3) Additional information that is relevant to content links. For example, a song link may be displayed with information about the artist and or reviews and links to further information such as lyrics, artist concert schedule, and the like.
4) A means for searching for particular content on the web portal and or its affiliate links.
5) A means for retaining user preference information for the purpose of customizing the web portal content according to the users preferences.

Content 10 from Internet 8 that may be used in the system disclosed here may be selected from a wide range of content selection web pages 22, that may be formatted differently, and may be available from many different content creators and content aggregators. Content creators include for example the music labels, such as EMI or BMG, both of New York, N.Y., that is, firms whose business it is to create or commission to create, and own content. Content aggregators are firms whose business it is to collect certain types of content, such as digital music, for the purpose of enabling ease of selection by end users and distribution. Examples of content aggregators are MP3.com, or Listen.com.

The capability for determining and aggregating the content objects 20 presented to a specific user on content selection web pages 22 are derived from content preferences selections provided by the user. For example, referring now to FIG. 22 a content preference selection web page 24 is shown with content selection check boxes 42 beside content selection labels 43 that describe a variety of content choices. The user uses the mouse to click on the boxes next to desired content types, as shown in FIG. 22. Thereafter upon returning to content selection web page 22, only content objects 20 that relate to the selected content types are displayed to the user. Functionally, content selection labels 43 are graphical representations of HTML links to actual content files, such as digital audio or digital video files. These links are organized and stored in a content link database 126 on content link database server 130.

The actual content files to which content selection labels 43 refer are stored at the content creator's or content aggregator's servers.

System Control Application

Referring now to FIGS. 1 and 2, a system control application 18 is comprised of two sub-applications, the core module 42 and the Graphical User Interface (hereafter GUI) module 46. In the preferred embodiment, core module 42 is implemented as a multi-threaded Java application with instances running on both PC 34 and storage gateway 38. A Windows version of a Java Virtual Machine (JVM) resides and runs on PC 34 and interprets core module 42 instructions for the Windows operating system Likewise, a VxWorks version of JVM interprets core module 42 instructions to VxWorks. GUI module 46 is implemented as a Win32 application and resides and runs on PC 34. System control application 18 serves the function of managing the connection between content 10 and various servers on Internet 8, and PC 34 and storage gateway 38, and also manages the flow of information between PC 34 and storage gateway 38, and client devices 78.

Core module 42 and GUI module 46 access and modify the system control application database 96 using methods called over HTTP and expressed with XML grammar. System control application database 96 is a set of files that contain system parameters and data For example, a track (song name) shown in audio device content editor 24 is referenced as a file name and a path designation a particular hard disk drive 30 on either of PC 34 or storage gateway 38, in a listing in system control application database 96. Actions that are taken, such as playing this file, are triggered by XML messages 74 sent from client devices 78 via LAN 70 or from GUI module 46 to core modules(s) 42 over HTTP.

The GUI module consists of segments of the software application that run the GUI, including, but not limited to, the following functions:
1. Displaying GUI elements on a computer display for view by the end user.
2. Acknowledging user responses made via mouse and keyboard, or other pointing and interaction devices.
3. Allowing for manipulation of the GUI elements such as:
   a. drag and drop 28 of content objects 20
   b. GUI button activations
   c. text entry.
   d. pull down menu and menu selections.
4. Communication between GUI module 46 and core module 42. The selections and control manipulations made by the end user are communicated to core module 42 where they can be acted upon.
5. Launching of specific device content and control editors from a system console 16, as shown initially in FIG. 3, described below.

Core module 42 consists of the portion of the system control application 18 that acts on content and data 10 from Internet 8 and also processes commands contained in messages sent from client devices 78, providing, but not limited to, the following functions:
1. Communication links:
   a. Accessing content 10 on Internet 8 at a prescribed location as determined by user inputs into the GUI content editors such as audio device content editor 24 and Internet clock content editor 40.
   b. Accessing and communicating with GUI module 46.
   c. Accessing and communicating with client devices 78.
2. Managing the caching (local storage) of content 10 from Internet 8 or otherwise digital content files.

3. Streaming of content 10 from Internet 8 to client devices 78 connected to PC 34 and storage gateway 38 via LAN 70.
   a. Managing and routing streaming digital content 10 from Internet 8 to client devices 78.
   b. Managing and routing streams of cached digital content 10 files on storage gateway 38 or PC 34 to the client devices 78.
4. Scheduling—time-based automation of the accessing, caching, and streaming of content 10 from Internet 8 at times prescribed by the user or at times derived by direction given by the user through the GUI content editors such as audio device content editor 24 and Internet clock content editor 40. The scheduling function accesses time and date inputs associated with actions stored in system control application database 96 by GUI module. The scheduling function periodically compares these time and date entries with the current state of PC's 34 or storage gateway's 38 internal timer. When there is a match, the action is taken.
5. Managing user responses at client devices 78—messages are sent from client devices 78 to core module 42, based on button activations at client devices 78.
6. Network Address Translation (NAT) and routing—certain client devices 78 must be connected to the Internet 8 in real time. Core module 42 acts to connect messages and streams from client devices 78 to Internet 8, and from Internet 8 to the client devices 78.
7. Client device 78 Application/Software Delivery—Client device 78 application code can be stored at PC 34 or storage gateway 38 and delivered to client devices 78 on an as-needed basis. For example, if the network device is audio playback device 86 that must be able to decode a variety of different encoded audio streams, then a specific CODEC (sent as a BLOB—binary large object) can be delivered to audio playback device 86 via LAN 70 and installed into memory 212 immediately before a content stream requiring that specific CODEC. Many different types of applications can be delivered just-in-time to client devices 78. The advantage of this feature is that is requires for example audio playback device 86 to have smaller quantities of non-volatile (flash) memory 216 and smaller quantities of volatile (SDRAM) memory 212. Reprogramming or modifying the firmware 220 at client devices 78 is also made easier since the software is accessible at PC 34 or storage gateway 38.
8. Transcoding—Certain types of content will be received at PC 34 or storage gateway 38, decoded, re-encoded using a different CODEC at PC 34, and then streamed to client devices 78.
9. Auto-discovery—Client devices 78 connected to PC 34 via LAN 70 will automatically appear as a specific client device control bar 26 on console 16 located on PC 34 desktop 12. One or more client device control bars 26 constitute console 16, shown in FIG. 3 through FIG. 11.
10. Message Transactions—text or other content or data from the Internet 8 can be transferred and presented on display 170 and display 132 client devices 78.
11. Tag servicing—when a tag button 128 or tag button 188 is pressed on one of client devices 78, time, data, and information pertaining to currently playing content is aggregated into a message and sent to tag storage and processing server 138. Tag processing services included in core module 42 acquire information that is included in the message. Tagging is described in greater detail later in this document. Tag servicing includes a function where core module 42 periodically accesses a specific location on Internet 8 to acquire and store an accurate time and date.
12. Synchronization—Data, such as user data and related information, such as an accurate time and date, must be synchronized across the three platforms (web, device, and local server). Core module 42 time and date data is thus synchronized with an external (absolute) standard.
13. Mirroring—Users can specify that content selections they make using the device content editors are to be mirrored at various other devices. For example, a user may have audio playback device 86 and a car caching and playback device. The user can specify that they want content 10 from Internet 8 that is cached on storage gateway 38 in the home to be mirrored exactly in the car-based caching device. The end user can thereby access all of the exact same content 10 in the same playlist structure in both the home and in the automobile.

System control application 18 and system control application database 96 are designed to function with a number of instances of core module 42 and GUI module 46 running concurrently on multiple PCs 34 and or storage gateways 38, all connected by the same LAN 70. It is anticipated that users will own and operate multiple PCs 34 in a single home for example, with different content 10 cached on each PC 34. However, for the purpose of simplicity in describing the basic functionality of the system, the preferred embodiment will focus will be on a singular GUI nodule located and executed on a PC.

Client Devices

Client devices 78 can take many physical forms but the common attribute is that it client devices 78 are nodes on LAN 70, receiving digital content and data 10, and instructions, from core module 42 subsystem of the system control application 18, and sending back XML message 74 control instructions and data from interaction or data that originates at client devices 78. In the preferred embodiment client devices 78 include webpad 92, audio playback device 86, Internet clock 82, digital picture frame 100, and automotive storage device 142. Generally, client devices depend on LAN 70 connectivity to provide the majority of their functionality. Client devices 78 range widely in the amount of integral memory capability. For purposes of clarity, the preferred embodiment shows in detail how content is set up, organized, and scheduled for delivery to two media player devices: audio playback device 86 that is connected to a stereo receiver 115, and Internet connected clock 82. However, it should be clearly understood that the system is designed to function with a wide variety of networked client devices 78 and audio playback device 86 and Internet clock 82 are described as examples of how the system functions.

FIG. 12 shows an isometric view of the audio playback device 86. The purpose of audio playback device 86 is to functionally connect digital audio content from a remote digital audio source to an already existing conventional stereo system Audio playback device 86 receives a stream of encoded audio content from PC 34 or storage gateway 38, real-time decodes it in real-time, and converts the uncompressed digital information into analog electrical signals. Audio playback device 86 includes a plastic injection-molded main housing 168 that contains a printed-circuit board (PCB) 218. PCB 218 electrically connects the components of a computer, comprised of a microprocessor 208 with dynamic memory (SDRAM) 212 and programmable (flash) memory 216. Microprocessor 208 in combination with dynamic memory 212 executes instructions from its operating system and programming, referred to as the firmware 220 stored in programmable memory 216. Audio playback device 86 also includes a wireless network interface sub-system 228 for communicating with PC 34 and storage gateway 38, an infrared (IR) control sub-system 146 for processing IR commands from the IR remote control 90, and a display 170 sub-system for presenting text and graphical information to the user. Audio playback device 86 also includes a digital-to-analog converter (DAC) 224 for converting the uncompressed digital information into analog signals that are presented at the standard left and right RCA connectors, 240 and 244. Audio playback device 86 firmware 220 also includes a CODEC for decoding the audio file that is streamed to it from PC 34 or storage gateway 38. In this embodiment, remote control 90 can be attached to audio playback device 86 front bezel 160, as shown in FIG. 12. FIG. 20 shows remote control 90 removed from the front bezel. FIG. 19 is a block diagram showing how left analog output 240 and right analog output 244 included in audio content playback device 86 are connected respectively to the left line input 248 and right line input 252 on existing stereo receiver 115. Stereo receiver 115 functions in the conventional way, pre-amplifying and amplifying the audio signals and delivering them to the left speaker 272 and the right speaker 276. As shown in FIG. 19, audio playback device 86 also includes a terrestrial broadcast tuner subsystem 236 for tuning local AM and FM broadcast radio.

Audio playback device 86 remote control 90 includes button controls for the following functions: Power button 196—for powering the device on and off; Source/User button 204—for selecting the user (owner of playlists and corresponding tracks) or for selecting storage gateway 38, PCs 34, or terrestrial broadcast, from which content 10 from Internet 8 or other terrestrial content will be delivered; Playlist forward button 176 and playlist back button 172—for advancing through and selecting playlists; Track forward button 184 and track backward button 180—for advancing through and selecting tracks for playback; Play/Pause button 192—for starting and pausing (stopping at point in the middle of a playback of an audio file); Stop button 200—for stopping playback of audio content; Tag button 188—for triggering the transmission of information about a currently playing track (file, Internet 8 stream, or terrestrial broadcast) back through the system for delivery to the end user on a website or for delivery to the content creator or content originator; User-defined button 206—This button may be associated with a variety of functions as selected by the user using the audio playback device setup GUI.

The text descriptors associated with the playlists and associated tracks are sent to audio playback device 86 when requests are made by button activations. For example, if the user activates forward playlist button 176, the text string for the next playlist after the one that is currently being played is sent to audio playback device 86 via LAN 70, is processed, and the text is displayed on display 170. Likewise if forward-track button 184 is activated, the text string that is the name of the next sequential file from the current playlist stored in system control application database 96 located on storage gateway 38 or PC 34, is sent by core module 38 to audio playback device 86, where the text string is displayed on display 170. If play button 192 is then activated, the currently playing track is halted and the track that is being displayed is sent, decoded, and played through the stereo system. The functional interface to the user of audio playback device 86 is similar to that found on a typical CD changer, where the CD represents the playlist, and the tracks on the CD represent the tracks in the playlist.

FIG. 13 shows an isometric view of Internet clock 82. Internet clock 82, is similarly comprised of a plastic injection-molded main housing 122 with a microprocessor 156, dynamic memory 140, non-volatile memory 144, TFT display 132, and operating system and firmware 146 programming. Display 132 on Internet clock 82 in the preferred embodiment is a large TFT graphics LCD, capable of showing images with 8-bit color. The control buttons or dials on Internet clock 82 include the following:

1. The Softkey buttons 124a, b, c, d, and e, along-side display 132 that are labeled by graphics on display 132. Softkey buttons 124a-e can be used as presets to allow the user to jump to content presentations that are associated with each button by a GUI pull-down menu 52 on Internet clock content editor 40, as shown in FIG. 11.
2. Volume dial
3. Snooze button 120 (on/off)
4. Source select (terrestrial radio, Internet 8 content)
5. The Tag Button 128—for triggering the transmission of information about a currently playing track (file, Internet 8 stream, or terrestrial broadcast) back through the system for presentation to the end user on tag aggregation web page 56, or for delivery to the content creator or content originator.

Internet clock 82 includes microprocessor 156 and memory 140 sufficient to receive and decode a full-motion video stream. Internet clock 82 also contains an integral sound system consisting of an amplifier and speakers 136. Therefore Internet clock 82 is capable of presenting audio, video, and interactive multimedia The digital electronics and packaging technology for such a devices is well known in the consumer electronics industry, so it will not be described in greater detail.

Preferred Embodiment

Use of the System

There are three functional modes: (1) setup, (2) real-time user controlled content/data delivery, and (3) automatic content/data delivery.

The setup functions provide the user with the ability to organize and manage content that is to be sent to a device. Content 10 may be stored or generated on Internet 8, or may exist on a local storage device, such on the PC's 34 hard disk drive 30, or on storage gateway 38. This content is organized and managed with the use of device content editors that are an aspect of GUI module 46 of system control application 18.

A content editor is a part of GUI module 46 and is used for managing and manipulating content 10 that will be sent to networked client device 78. The preferred embodiment will describe audio device content editor 24, used to program and control content 10 for audio playback device 86; and Internet clock content editor 40, used to program and control content for Internet clock 82. Content editors are launched from console 16. This action is explained later in this disclosure.

Audio device content editor 24 provides the user with the ability to group audio files (tracks) into user-defined playlists, which are text association that contains a list of and paths to audio files or the URLs or IP addresses of audio streams, and are stored in system control application database 96. For example, a user may create a playlist called "Classical Music" that contains ten Beethoven symphonies. A common type of audio file format is the MP3 (MPEG layer 3) format. Certain tracks such as MP3 music files are stored on hard disk drive 30 on PC 34, while other tracks such as streamed Internet 8 radio, are stored as URLS or IP addresses. Streamed media can be in a variety of formats. A popular format is in the Windows Media format, created by Microsoft Corporation of Redmond, Oreg. The audio device content editor 24 capability includes, but is not limited to, the following functionality:
1. Display playlists
2. Display tracks in a playlist
3. Create a new playlist
4. Delete a playlist and its associated tracks
5. Add a track to a playlist
6. Reorder playlists (accomplished by dragging and dropping the playlists in the GUI window frame)
7. Delete a track from a playlist (highlight the track, activate the "delete" button)
8. Reorder tracks in a playlist (this is accomplished by dragging and dropping the tracks in the playlist editor).

The interaction between audio device content editor 24 and the other elements of the system will be discussed later.

The function of Internet clock content editor 40 is to manage content 10 that is associated with a scheduled routine, such as a wakeup routine. Internet clock content editor 40 allows the user to associate content 10 such as audio or video files (stored on the user's hard disk drive 30 or streamed over Internet 8) with an associated time and date. A set of content selections for the one-week period shown on Internet clock content editor in FIG. 8 is called a wake-up routine. For example, referring now to FIG. 9, the user can associate a pointer to a news stream from the Internet 8, shown as "MSNBC" in the figure, to be triggered at 8 am on Monday through Friday. This association is created by dragging and dropping 28 content object 20 from content selection web page 22, to Internet clock content editor 40. At the prescribed time, the scheduler function in core module 42 initiates the serving of content designated by content object 20, to Internet clock 82, where it is played or presented to the user to wake them up, or for other purposes where automatic triggering is required.

The Internet clock content editor 40 capability includes, but is not limited to the following functionality:
1. Display calendar (time, days, weeks, months, dates, and the like)
2. Select and associate content with a time and date
3. Add additional content to a pre-existing routine
4. Delete a content object from a routine
5. Play audio files from an audio playlist (a playlist made using the audio device content editor)
6. Schedule the display of graphics files, such as a series of digital pictures on Internet clock 82 when it is not executing a scheduled wake-up routine.
7. Associate a content type or content module with one of the softkey buttons 124 located beside display 132.
8. Synchronize with a user's personal (digital) information manager (PIM), such as a Palm Pilot made by Palm, Inc. of Santa Clara, Calif., or the Cassiopeia, made by Casio Inc., of N.J.

Both audio device content editor 24 and Internet clock content editor 40 are launched manually by the user by clicking on the associated client device control bar 26 on console 16. FIG. 3 shows PC desktop 12 with console 16 showing three client device control bars 26 (the PC's speakers here are not considered a client device although audio can be channeled to them). For example, considering FIG. 3 as the initial state of launched and running system control application 18, using the mouse the user would position the pointer on PC desktop 12 on client device control bar 26 that is associated with audio playback device 86 and activate the left mouse button. Audio device content editor 24 launches and the result is shown in FIG. 4, with audio device content editor 24 displayed on PC desktop 12.

PC desktop 12 in FIG. 4 also shows content selection web page 22. Content selection web page 22 can be launched in a number of ways. One method for launching content selection web page 22 is to activate the Content guide button 44 located on the bottom of console 16 by using the mouse to place the pointer on top of Content guide button 44, and pressing and releasing the left mouse button. Another launching method is to have content selection web page 22 "bookmarked" (Netscape Navigator) in a browser, or added to a "favorites" list in a browser (Microsoft Internet Explorer). This type of Internet 8 browsing shortcut to a specific web page is well known in the computer industry.

The spherical icons on content selection web page 22 are content objects 20 that are dragged and dropped onto the audio device content editor 24 tracks window 66. Using the mouse to control the pointer on PC desktop 12, the user moves the pointer on top of content object 20, depresses the left mouse button, and moves the pointer-content object 20 bundle to tracks window 66 of audio device content editor 24 (while continuing to depress the left mouse button). When the user releases the left mouse button, a text description of content object 20 appears in tracks window 66 of audio device content editor 24. FIG. 5 shows that content object 20 "Top 40 Radio" has been dragged from content selection web page 22 to audio device content editor 24 tracks window 66, with drag and drop path 28 depicted. The user would perform this drag and drop operation on content objects 20 for which playback at audio playback device 86 is desired. For example, the "Top 40 Radio" content object 20 represents the URL of an Internet 8 radio stream. As shown in FIG. 6, the user can also add audio files to the playlists using a conventional Windows dialog box that allows the user to navigate to a specific sub-directory on PC 34. This type of PC 34 file access is a well known function of PCs 34. Audio device content editor 24 also provides the capability for the user to create playlists. This is accomplished by using the New List button 37, shown as part of audio device content editor 24 in FIG. 4 through FIG. 7. FIG. 7 shows that a playlist creation text entry box 36 is launched when the user activates New List button 37.

On the software action level, when a user creates or modifies a playlist by adding tracks such as described above using audio device content editor 24, GUI module 46 modifies system control application database 96, a file that contains the text names of playlists, the file names and paths of local content files, and URLs of streams, that the user has selected as tracks. A copy of system control application database 96 is stored on both the PC's hard disk drive and on the storage gateway's hard disk drive. In the preferred embodiment, a portion of the files that are set up by the user as tracks in playlists that are accessed at audio playback device 86 are stored on storage gateway 38. In this scenario, the user can still access tracks stored on storage gateway 38 at audio playback device 86 if PC 34 has been shutdown. The system may also function with the some or all of the files that constitute the tracks listed in audio device content editor 24 stored on the PC 34. It is obvious that PC 34 must be booted and functioning for the user to access any files stored on PC 34. The action of accessing those files at audio playback device 86 is discussed below.

FIG. 8 shows an initial state for using the Internet clock content editor 40. Internet clock content editor 40 is formatted as a calendar (with a time domain format), since Internet clock 82 will have varying content depending on the time of day or night. Internet clock content editor 40 is also launched from console 16 in the same way that audio device content editor 24 is launched. FIG. 9 shows Internet clock content editor 40 after content object 20 has been dragged onto the editor window in the "Monday" slot. FIG. 10 shows that the user has dragged content object 20, expanding it across the weekly calendar slots, stopping on the "Friday" slot. Once content object 20 is dragged and placed onto Internet clock content editor 40, content object 20 is referred to as an expandable content bar 48; Expandable content bars 48 are dragged across the day sections of Internet clock content editor 40 by using the mouse to position the pointer on the right side of expandable content bars 48, depressing the left mouse button, dragging across Internet clock content editor 40 (expandable content bar 48 will graphically elongate) while keeping the mouse button depressed. The mouse button can be released when expandable content bar 48 is dragged to the last day on which content 10 referred to by expandable content bar 48 is to be played. Again referring to FIG. 10, the result of this programming activity is that every day of the week between Monday and Friday, core module 42 will automatically send prescribed content 10 to Internet clock 82 at the time indicated on left hand side of Internet clock content editor 40, or at the time that the user has set as the wake-up time at Internet clock 82. Settings at Internet clock 82 take precedence over Internet clock content editor 40 settings.

In setup mode, GUI module 46 receives commands from the user via the GUI that is drawn on PC desktop 12. The user's actions and decisions are recorded by device content editors such as Internet clock content editor 40 and audio device content editor 24 which comprise GUI module 46, are encoded as digitally described messages, and are then communicated to and stored in system control application database 96 by core module 42. In the preferred embodiment, where core module 42 exists as a JAVA software program on storage gateway 38, content 10, the playlists, and names of tracks and stream addresses, are stored on hard disk drive 30 at storage gateway 38. PC 34 also contains a copy of system control application database 96.

Preferred Embodiment

Real-Time Mode

In real-time mode, the user can activate and control the delivery of content 10 that has been set-up in audio device content editor 24, either at audio playback device 86, or at PC 34. In the preferred embodiment where audio playback device 86 is connected to stereo receiver 115, the user can access the playlist information on an interface at audio playback device 86. FIG. 12 shows that remote control 90 is used to access the source, playlist, and track (content object 20) at audio playback device 86. Display 170 included on audio playback device 86 displays text information according to the manipulations of the controls by the user. For example, when the user presses forward playlist button 176 on remote control 90, an IR stream is transmitted from remote control 90 and is received by IR subsystem 104 on audio playback device 86. This message is decoded by microprocessor 208 in audio playback device 86 as a forward select button selection, and an XML message 74 is sent from audio playback device 86 to core module 42 requesting that a string of text that represents the next playlist title be sent via high-speed LAN 70 to audio playback device 86. Core module 42 receives XML message 74 and sends the text string representing the next playlist to audio playback device 86, via high-speed LAN 70. Microprocessor 208 processes this XML message 74 and displays the text string on audio playback device 86 display 170.

When play button 192 is pressed, again IR subsystem 104 triggers XML formatted message 74 to be sent to core module 42 stating that play button 192 was activated. Core module 42 determines the present file or stream listing on audio playback device 86 display 170, and initiates a stream of that file or Internet 8 stream to audio playback device 86.

The other method for controlling client devices is to use a device controller GUI on PC 34. Device controllers are launched from console 16 by right clicking on client device control bar 26 on console 16 associated with the specific device that is to be controlled. FIG. 15 shows the audio playback device controller 60 and FIG. 16 shows the Internet clock device controller 88. The function of a device controller is to remotely control networked client devices 78, and to also allow for the setting of certain preferences and features for client devices 78. Thus continuing with our previously mentioned examples, audio playback device controller 60 is used to directly control audio playback device 86, such as to instruct audio playback device 86 to play, stop or pause on a particular track. Similarly Internet Clock controller 88 is used to directly control Internet Clock 82 such as to turn Internet clock on or off, or set the date or time, as shown in FIG. 16.

The following is a list of controls and features for audio playback device controller 60: a play/pause button 80 (holding down play button causes the player to fast forward, playing brief samples of the audio file at muted volume); a stop button 76; a track backward button 72; a track forward button 84; a balance slider 98.

The following is a list of controls for features on Internet clock controller 88: ramp display back light during wakeup routine (slowly increase the light of the display during the wakeup routine); ramp audio volume during wakeup routine (slowly increase the volume of the device during the wakeup routine; length of dwell time for snooze button (the length of time that Internet clock 82 is dormant after snooze button 120 is activated; deactivate snooze button 120 (no snoozing); length of time for sleep mode (the length of time Internet clock 82 will play content 10 when activated at night while the user is falling asleep). The function controls now shown in FIG. 16 are available on an additional menu accessed by activating "more" button 110.

Preferred Embodiment

Automatic Mode, Playback

In automatic mode, content 10 that the user has selected for playback in the content editor is sent automatically to the playback device, based on some prescribed time setting that was pre-set by the user. A scheduling function in core module 42 compares time inputs listed in system control application database 96 with the current state of PC 34 system timer. When a match occurs between a time input in system control application database 96 and the current state of PC 34 system timer, core module 42 initiates the delivery of content 10 to client device 78. In the case where content 10 is a stream from a URL on Internet 8, a connection is created by core module 42 between the streaming URL via broadband communication link 14, through storage gateway 38, and via LAN 70 to client device 78.

Preferred Embodiment

Automatic Mode, Caching

Certain content objects 20 designate a location for file-based content 10 that changes on a regular basis. In this case, a specific file is a content object 20 instance that is cached on local PC 34 or storage gateway 38 and streamed to client device 78. For example, content 10 for Internet clock 82 may include a digital audio file with news located on a server on Internet 8 that may be updated every four hours. If content object 20 instance is a file designation that is not local, the scheduling function in core module 42 will periodically check the file at its location on Internet 8 to see if the file has changed. It will do this by comparing the locally cached file's creation date and title, and other file information, with the file located on Internet 8. If the file's creation date and/or title has changed, the new file will be downloaded and stored on PC 34 or storage gateway 38, so that the latest file can be sent to client device 78 at the prescribed time. This is part of the scheduling function listed in core module 42 functions in FIG. 2.

Storage gateway 38 is an "always-on" device. Therefore the scheduling function running on core module 42 on storage gateway 38 can be set to automatically access and acquire content 10 on Internet 8 at times when wide area network bandwidth is less expensive, such as overnight or during midday. Core module 42 on storage gateway 38 call also limit data-rates at certain times to further optimize wide area network bandwidth usage. For example, core module 42 can be limited to download data-rate speeds of 200 Kbps during the hours of 4 pm to 10 pm, and allowed to download at the maximum broadband rate any other time. This download optimization setting can be set by users, who may want access to bandwidth while they are home in the evening, or it may be set by network operators. These data-rate control settings and times may be set using a network bandwidth optimization control GUI, accessible by user at PC 34 or by network operators remotely. The data-rate control settings and times are stored in system control application database 96.

Preferred Embodiment

System-Wide Functions—Tag Interactivity

Because LAN 70 technology is a two-way interconnection technology, responses from client devices 78 can be sent back through the system and processed and presented to the user and other interested entities at both PC 34 and on the web. FIG. 12 shows tag button 188 on audio playback device 86. FIG. 13 shows tag button 128 on Internet clock 82. During the playing of content 10, activation of tag button 128 by the user results in a transmission of XML message 74 back through LAN 70 informing core module 42 that the tag button 128 was activated. Core module 42 then compiles and transmits tag XML message 74 to tag storage and processing server 138. This process is described in FIG. 21. The information in core module 42 tag XML message 74 may include but is not limited to: metadata or meta-tags included in the file or stream (characters or images); the file name if content 10 is a file; the URL or IP address of the stream if content 10 is a stream; time; date; and user identifier.

The transmission of tag XML message 74 can have different results. FIG. 14 shows that the information in the message formatted as a readable text message and presented to a user on a personal tag aggregation web page 56. In this scenario, the user has signed up with an account and receives a password for entry into protected tag aggregation web page 56.

The tagging function requires that core module 42 always have access to accurate time and date information. FIG. 2 shows that core module 42 has a function that accesses a server on Internet 8 where accurate time and date data is available, and these quantities are stored locally by core module 42 in system control application database 96 and is updated relative to the internal time and date timer located internal to PC 34 or storage gateway 38 that stores and runs core module 42 aspect of system control application 18.

Alternative Embodiments

An alternative embodiment of this system includes the TV as an output device for using GUI module 46 aspect of system control application 18. In this embodiment, system control application 18 resides on a set-top box that includes the components and functionality of storage gateway 38. Set-top boxes are available that include a DOCSIS cable modem as well as a CATV tuner, hard disk drive 30, and microprocessor 280. In this system, the TV can be used as the output device on which the device control GUIs are visually presented, and a set top box remote control with a cursor pointing function is the input device. The GUI images look and function virtually identically to those shown in FIG. 3 through FIG. 11. Most set-top boxes already contain the circuitry and firmware to draw images on a TV screen (NTSC format), so GUI module 46 would be minimally modified to support the number of pixels on conventional TV screens.

Alternative Embodiment

Storage Gateway Peripheral

A storage gateway peripheral 134 is defined as a computer with a integral hard disk drive 30 and processing capability, and an integral wireless LAN transceiver 58 to provide LAN 70 connectivity, that is added to an existing gateway 150 device for the purpose of adding content 10 mass storage and serving capability. FIG. 23 shows a network topology including PC 34, a conventional gateway 150 that is a DOCSIS cable modem. Storage gateway peripheral 134 is connected to gateway 150 via a wired LAN connection, in this case Ethernet, that is included in all gateways 150. Storage gateway peripheral 134 is always-on, and includes power management features such as the ability to power down hard disk drive 30. Core module 42 is stored and runs on storage gateway peripheral 134, thus all of the services and functions provided by a system using a storage gateway 38 are provided with the use of a storage gateway peripheral 134.

Alternative Embodiment

GUI Content Editors on Storage Gateway or Gateway Storage Peripheral

The content editors can be programmed and executed across the network as Java applications stored on storage gateways 38 or on a storage gateway peripheral 134 device. The advantage of this is that any computer with a display and input peripherals such as a keyboard and a mouse, and that has a Java Virtual Machine (JVM), would be a viable client device content programming, set-up, and control workstation. This embodiment could also be implemented so that it was entirely browser-based. A user could access the device content editors within a browser window, with the application running as a Java applet.

Alternative Embodiment

Digital Image Player and Sequence Editor

Another device that can exist as a client device in this platform is digital picture frame 100. One implementation of digital picture frame functionality is to set up Internet clock 82 to present a timed sequence of digital images on LCD 132 when Internet clock 82 is not being used for presentation of other content 10. Internet clock 82 can be set up to present digital images either automatically or under direct control of the user.

The user could attach a digital image to one of the softkey buttons located on Internet clock 82. A separate GUI, the digital image editor 102 would be accessed via the left-mouse-click on Internet clock 82 client device control bar 26 located on console 16. Launching this editor is similar to launching audio device content editor 24, described previously. FIG. 18 shows an example of digital image editor 102. There is a frame into which the user can drag-and-drop image files, or the user can navigate to image files via a conventional dialog box, and add these image files to the frame. The frame would then show a small image of the actual file. The user can drag-and-drop these images to reorder them.

Alternatively, dedicated digital picture frame 100 can be used to display digital images. Referring again to FIG. 18, digital image editor 102 is a GUI that is used to create a digital image playlist for such a device. Digital image editor 102 is launched by left-clicking on the "digital image player" client device control bar 26 on console 16.

Alternative Embodiment

Digital Video Caching

The system for providing content distribution, management, and interactivity for thin client devices can also be used to access, store, and serve digital video, such as movies, TV shows, and other video content. User's make selections on a web site as disclosed herein. Digital video files, such as DVD movies are then downloaded and stored on user's PC 34, storage gateway 38, or storage gateway peripheral 134. The digital video files would then be sent to a client device 78 that is a TV, or any other client device that can decode and present digital video. For example, a PDA with a wireless LAN 70 capability and the ability to decode MPEG-2 video would be a viable terminal client device 78. The advantage of this system, as opposed to streaming digital video directly from a cable headend or DSL ISP is that is makes better use of network bandwidth Digital video files are very large, potentially several giga-bytes (billions of bytes). The downloading of these large files can be spread out over a longer period of time than would be required if the digital video files are streamed and viewed in real-time. The digital video files can always be downloading during periods of inactivity on wide area broadband communications connection 14. Additionally, the download data-rates can be controlled based on the time of day. For example, core module 42 includes a data-rate control function described in this disclosure. The allowable data-rate can be reduced for peak times of wide area network usage, and can be increased during off-peak times.

Alternative Embodiment

Automated PC-Only

The system for providing content and other information services to thin client devices can be implemented with just PC 34. System control application 18 resides on hard disk drive 30 on PC 34 and provides all of the functions and features including those provided by core module 42 and GUI module 46. System control application database 96 also resides on PC 34, as well as all cached content 10. In this embodiment, LAN 70 is established by the use of a HomeRF wireless LAN access point 54. The wireless LAN access point 54 is a self-contained device that communicates with PC 34 via the USB port. Wireless LAN access point 54 includes an RF network interface transceiver 58, and a microprocessor 116 and firmware for managing the transfer of data between host PC 34, and an antenna 112. There is also an antenna integrated into a plastic housing. Wireless LAN access point 54 gets its power from the USB connection. In this embodiment, the wireless LAN access point 54 could also be incorporated into an internal add-on bus card, such as a card that would attach to the PCI bus. Such peripheral bus cards are well known in the field of PC design. In the case of a bus card, there would be an external antenna.

The automated services function of core module 42, whereby content 10 is automatically accessed, downloaded and cached on PC 34, and whereby content 10 is automatically streamed to client devices 78, is facilitated if PC 34 is always on, or if PC 34 can be automatically turned on (booted). PC 34 includes a Basic Input Output System (hereafter BIOS) for controlling the basic functions of the system. The BIOS may also be used to automate the booting of PC 34. In the implementation whereby PC 34 boots automatically, system control application 18 includes software that can modify the BIOS software of PC 34 so that automatic pre-scheduled activation of PC 34 is enabled. Subsequent control of PC 34 to connect to the Internet 10 and perform operations, is also provided by the scheduling function in core module 42. The BIOS consists of a set of instructions and data that the microprocessor uses as part of its initial sequence of operation. These instructions are stored in a BIOS flash memory chip, which is a non-volatile type of memory chip, so that the instructions and data are retained when power to the computer is turned off. BIOS software and design, as well as reprogrammable flash memory technology, is well known in the PC industry and will not be described in detail here. The date and time that the computer uses for various purposes is a function that is controlled by the BIOS chip and interface. Typically, a PC motherboard includes a timer and date function that is backed up by a battery on the motherboard. The purpose of this system is so that when the computer is turned on, the operating system has access to accurate time and date information. Since the time and date (timer) function is always operating on a computer motherboard, and this system is connected to the BIOS, most BIOS systems include an automated wakeup function. This is a function that operates internal to the BIOS chip and can be activated or de-activated. If the automatic wake-up function is turned on and a specific time and date is entered and stored in the BIOS memory, a software function operating in the BIOS continually compares the current date and time with a designated wake-up time and function that is stored in memory. When the two times and dates match, a power-on command is given and PC 34 power-up sequence begins. The BIOS modification software automatically modifies the BIOS from the OS level, so that the user doesn't have to access the BIOS during the early phase of PC 34 boot.

Another function that is performed by the BIOS modification software is to modify the internal settings of PC 34 that control the power saving modes and control parameters which include parameters such as when the PC display is turned off, and when drives are spun down while PC 34 is operating. The BIOS modification software allows for the "always-on" operation of PC 34. In this case, the PC can be put into a low-power mode with monitor off and with the drive not spinning. Control of various power saving modes is also provided for users at the operating system level. The Advanced Configuration and Power Interface, created by Intel of Santa Clara, Calif. is a set of functions that provide control of PC 34 power usage, allowing the computer to be put into various suspend states, as well as spinning down drives and other functions. Power control functions in core module 42 modify ACPI settings, providing for quiet, low power operation of PC 34.

The function of this embodiment will now be described. PC 34 exists in the user's home, or other location where there is a desire for the ability to play Internet 8 content or data 10, including multimedia content, on one or more standalone devices apart from PC 34. There is a setup activity for the system, requiring several one-time actions by the user. Then there is an actual use scenario. Referring now to FIG. 5, first, the setup activity will be described.

PC 34 is booted (started up) and a connection to Internet 8 is made. This is achieved by using the dial-up networking function that is standard on any machine with the Windows operating system. This connection could also be an always-on DSL, ISDN, or cable modem connection. Once a connection is made to Internet 8, browser software is started and the user would navigate to a specific information appliance setup website associated with the system and the devices. This website would have a particular URL that would be supplied in the instruction materials that come with wireless LAN access point 54 or client device 78. Using the browser, or other interface to the website server, the user would navigate to a setup page at the website that asks for a serial number of client device 78 that the user is planning to use. The user would then connect the USB cable on wireless LAN access point 54 to the USB port on PC 34. The user would then enter this serial number, which is included in the documentation that is included with the end-user device. The online application has a database of these serial numbers that are associated with each individual manufactured client device 78 (including both wireless LAN access point 54 and client device 78) that are distributed into the market. Once a match is made between the serial number that the user entered at the website, and a serial number that is included in the online database, an online application automatically begins downloading and installing system control application 18 to user's PC 34. This software is installed on user's PC 34 and provides the following functions.

A scheduling function determines when PC 34 automatically connects to the Internet. If PC 34 is running in a power saving mode, such as with the display turned off and with the drives not spinning, the scheduling function will initially act to take the PC 34 out of power saving mode, and then to automatically connect to the Internet using the Dialup Action. Many users will already have PC 34 set up to dial up to an Internet service provider (ISP). In this case, the dialup networking function that already exists will be used. If the user does not have this installed on PC 34, an application is included that will install the correct dialup information, so that a connection is made to the correct ISP and server.

At 12 am, PC 34 automatically boots and dials up the ISP. An Internet 8 connection is established. PC 34 automatically connects to the web server associated with client device 78. Here the user's account is referenced as well as the identifying serial number of user's client device 78. A volume of content 10 that the user specified to be automatically delivered to Internet clock 82 is downloaded to user's PC 34, where it is stored on the PC 34 hard disk drive 30. After the content has completely downloaded, PC 34 terminates the connection to the ISP, and shuts down. This occurs at 1:30 am. At this point PC 34 may also be kept on, as selected by the user during the configuration of the system.

At 5:30 am, the PC again automatically boots. The wireless communication system establishes a connection to Internet clock 82. At 6:00 am, the specified wake up time of the user, PC 34 initiates the transfer of content to Internet clock 82. This content is presented to the user as sound and images, waking up the user.

Alternative Embodiment

Web-Based System Control Application

In an alternative embodiment there is a website that is accessed for the purpose of downloading and setting up the system control application 18 on PC 34, and for controlling the content that is sent to client devices 78, and for controlling the features of client devices 78. This website is accessible from any computer that is connected to the Internet 8 and includes a browser. The website also contains a database for storing the content preferences of the user or owner of client devices 78. These content preferences include pointers to the locations of the content entities, such as audio files, video files, or text files, on Internet 8 that the user had specified to be played on client device 78. The website could also include a server-based version of system control application 18 that would retrieve and store content and data according to user preferences on the web.

Alternative Embodiment

Webpad Client Device

In this embodiment, client device 78 is a portable computing device referred to as a webpad 92, able to be carried around the house or within range of LAN 70. Webpad 92 includes a set of rechargeable batteries and a battery recharging system. There is also a dock into which the webpad 92 is placed during times when it is not used. When it is docked, there are electrical contacts in the dock that make contact with the electrical contacts on webpad 92 and the batteries are recharged. Webpad 92 also has stored in its non-volatile memory an identifying serial number, which is used to identify webpad 92 on the wireless network, and is also used to coordinate the content that is specified by the user to be sent to and cached at the local PC 34, and ultimately sent wirelessly to webpad 92. For example, users can access cached content on PC 34 or storage gateway 38 such as digital, searchable Yellow Pages or White Pages, and other reference databases. Additionally, webpad 92 can access the Internet 8 via PC 34 or storage gateway 38, utilizing PC 34 or storage gateway 38 as a router.

Furthermore, webpad 92 can be used to control other client devices 78. For example, a webpad 92 version of audio device content editor and audio device controller GUI allow the user to access playlists and tracks, and control audio playback device 86 in real time while away from PC 34. XML messages 74 are sent from webpad 92 to PC 34 or storage gateway 38, processed by core module 42, and appropriate XML messages are sent to audio playback device 86.

Alternative Embodiments

LAN 70 could be implemented with a number of different wireless systems such as 802.11b, 802.11a, or Bluetooth. The wireless communication system could be a 900 Mhz system used on many cordless phones. The system could be implemented with a phone line network system where the house wiring is used as the network physical layer for communication between PC 34 and client devices 78. The system could be implemented using an AC power line networking technology that uses the AC wiring in the home as the network physical layer. It should be noted also, that the system will work with any type of connection to the internet, including other broadband technologies such as DSL or fixed wireless, or a dialup modem connection.

A phone that includes a microprocessor, memory, and network interface is also a client device. The content 10 that would be transferred to it would be the digital address books, such as those that are a part of PDA databases and desktop organizer software, such as Palm Desktop or Microsoft Outlook. The phone numbers from these personal information managers, and other relevant phone numbers could be downloaded from the web and cached at the PC, and subsequently transferred to the phone database, so that dialing can be made much easier.

I claim:

1. An apparatus comprising:
    a first interface configured to communicate with a wide area network (WAN);
    a second interface configured to communicate with a client device via a local area network (LAN); and
    a server communicatively part of the LAN and comprising a storage device, wherein the server is coupled to the first interface and the second interface, wherein the server is configured to retrieve user specified content from a facility via the first interface, to store the user specified content, and to deliver the user specified content to the client device via the second interface;
    wherein the server further comprises a graphical user interface (GUI) configured to associate the user specified content with the client device and to schedule a future time when the user specified content will be automatically delivered to the associated client device via the LAN, wherein the GUI is further configured to allow scheduling a time when the user specified content is retrieved from the facility.

2. The apparatus of claim 1, further comprising a plurality of client devices, wherein the GUI is further configured to allow associating the user specified content with the plurality of client devices and scheduling a time when the user specified content is automatically delivered to the associated plurality of client devices via the LAN.

3. The apparatus of claim 1, wherein the LAN comprises a wireless network.

4. The apparatus of claim 1, wherein the GUI is further configured to allow specifying a personal preference for the user specified content to be retrieved from the facility.

5. A method comprising:
    downloading user specified content to a server from a facility via a wide area network (WAN);
    delivering the user specified content from the server to a client specified device via a local area network (LAN), wherein the server is communicatively part of the LAN, wherein the user specified content is delivered from the server to the client specified device according to a first schedule specified to the server by the user, and wherein the first schedule includes a future time at which the user specified content is to be delivered to the client specified device, and wherein the server is configured to allow scheduling a time when the user specified content is retrieved from the facility; and
    automating the downloading and the delivering of the user specified content.

6. The method of claim 5, further comprising downloading the user specified content according to a second schedule specified to the server by the user, wherein the first schedule and the second schedule are different.

7. The method of claim 5, further comprising downloading the user specified content based on a personal preference specified by the user.

8. A tangible non-transitory computer-readable medium having stored thereon, computer-executable instructions that, if executed by a computing device, cause the computing device to perform a method comprising:
    downloading user specified content to a server from a facility via a wide area network (WAN);
    delivering the user specified content from the server to a client specified device via a local area network (LAN), wherein the server is communicatively part of the LAN, wherein-the user specified content is delivered from the server to the client specified device according to a first schedule specified to the server by the user, wherein the first schedule includes a future time at which the user specified content is to be delivered to the client specified device, and wherein the server is configured to allow scheduling a time when the user specified content is retrieved from the facility; and
    automating the downloading and the delivering of the user specified content.

9. The tangible computer-readable medium of claim 8, wherein the method further comprises downloading the user specified content according to a second schedule specified to the server by the user, wherein the first schedule and the second schedule are different.

10. The tangible computer-readable medium of claim 8, wherein the method further comprises downloading the user specified content based on a personal preference specified by the user.

11. A method for presenting content, the method comprising:
    receiving an instruction for selecting a content to be downloaded from a wide area network (WAN) to a local system in response to an input received via a content selection interface of the local system;
    downloading the content from the WAN to the local system based on an availability of the content; and
    automatically delivering the content from the local system to a client device via a local area network (LAN), wherein the local system is communicatively part of the LAN, at a user specified time using a scheduling interface of the local system, wherein the scheduling interface is configured to receive a user specified schedule of one or more future times at which the content is to be delivered to the client device, wherein the scheduling interface is further configured to allow scheduling a time when the user specified content is retrieved via the WAN.

12. An apparatus for viewing content, the apparatus comprising:
    a first data processing system configured to communicate with a facility via a wide area network (WAN), wherein the first data processing system comprises a first interface configured to allow selecting a content stored at the facility, and a scheduling mechanism configured to allow scheduling a time of a future transaction for acquiring the selected content from the facility and configured to allow scheduling a time when the user specified content is retrieved from the facility; and
    a second data processing system configured to communicate with the first data processing system via a local area network (LAN), wherein the second data processing system is communicatively part of the LAN, and wherein the second data processing system comprises a second interface configured to schedule an automatic time to deliver the content from the first data processing system to a client device via the LAN.

13. An apparatus comprising:
a computing device configured to communicate with a wide area network (WAN) and configured to communicate with a client device via a local area network (LAN), wherein the computing device is communicatively part of the LAN;
a first user interface executable at the computing device, wherein the first user interface is configured to allow a user to select a content to be downloaded from a facility via the WAN;
a storage device operatively coupled to the computing device, wherein the storage device is configured to store the content; and
a second user interface executable at the client device and configured to select a plurality of client devices to deliver the content and scheduling an automatic delivery of the content at a user-selected future time from the computing device to the plurality of client devices via the LAN, wherein the second user interface is further configured to allow scheduling a time when the user specified content is retrieved from the facility.

14. The apparatus of claim 13, wherein the content is downloaded from the facility periodically.

15. The apparatus of claim 14, wherein periodically downloading the content is performed based on content availability information.

16. A tangible computer-readable medium having stored thereon, computer-executable instructions that, if executed by a computing device, cause the computing device to perform a method comprising:
downloading to the computing device a content from a facility via a wide area network (WAN) at a first time, wherein the computing device comprises a storage device;
storing the content in the storage device;
presenting a user interface configured to allow selecting a plurality of client devices communicatively coupled to the computing device via a local area network (LAN), wherein the computing device is communicatively part of the LAN, wherein the plurality of client devices are selected to receive a delivery of the content, wherein the user interface is further configured to allow scheduling of a future time to deliver the content to the plurality of client devices, wherein the user interface is further configured to allow scheduling a time when the user specified content is retrieved from the facility; and
automatically activating the delivery of the content from the computing device to the plurality of client devices via the LAN at a second time that is different than the first time.

17. The tangible computer-readable medium of claim 16, wherein the method further comprises downloading the content from the facility periodically.

18. The tangible computer-readable medium of claim 17, wherein periodically downloading the content is based on content availability information.

19. A method comprising:
downloading user specified content to a server from a facility via a wide area network (WAN);
delivering the user specified content from the server to a plurality of client devices via a local area network (LAN) according to an association between the plurality of client devices and the user specified content, wherein the server is communicatively part of the LAN, wherein the association between the plurality of client devices and the user specified content is established through a graphical user interface (GUI) of the server, and wherein the association includes a plurality of scheduled times at which the user specified content is to be delivered to the plurality of client devices, wherein the GUI is further configured to allow scheduling a time when the user specified content is retrieved from the facility; and
automating the downloading and the delivering of the user specified content.

20. The method of claim 19, wherein delivering the user specified content to the plurality of client devices is based on a schedule established through the GUI.

21. A system for providing content, the system comprising:
a first data processing system configured to communicate with a facility over a wide area network (WAN), wherein the first data processing system comprises a first interface configured to enable selecting a content stored at the facility, and a scheduling mechanism configured to enable scheduling a transaction for acquiring the selected content from the facility; and
a second data processing system configured to communicate with the first data processing system via a local area network (LAN), wherein the second data processing system is communicatively part of the LAN, wherein the second data processing system comprises a second interface configured to schedule a plurality of future times at which to automatically deliver the content from the first data processing system to a client device via the LAN, wherein the second interface is further configured to allow scheduling a time when the user specified content is retrieved from the facility.

* * * * *

UNITED STATES PATENT AND TRADEMARK OFFICE
CERTIFICATE OF CORRECTION

| | | |
|---|---|---|
| PATENT NO. | : 7,937,450 B2 | Page 1 of 1 |
| APPLICATION NO. | : 10/775285 | |
| DATED | : May 3, 2011 | |
| INVENTOR(S) | : Janik | |

It is certified that error appears in the above-identified patent and that said Letters Patent is hereby corrected as shown below:

Title page, item (56), under "Other Publications", in Column 2, Line 3, delete "lighnetco.uk" and insert -- lightnet.co.uk --.

Title page 3, item (56), under "Other Publications", in Column 1, Line 2, delete "World'with" and insert -- World' with --.

Title page 3, item (56), under "Other Publications", in Column 2, Line 7, delete "Intenet" and insert -- Internet --.

Column 1, line 4, below "Title" insert -- CROSS-REFERENCE TO RELATED APPLICATIONS --.

Column 26, line 15, in Claim 8, delete "wherein-the" and insert -- wherein the --.

Signed and Sealed this
Ninth Day of August, 2011

David J. Kappos
*Director of the United States Patent and Trademark Office*